(12) United States Patent
Louisell, III et al.

(10) Patent No.: US 12,554,784 B2
(45) Date of Patent: Feb. 17, 2026

(54) SYSTEM AND METHOD FOR PREDICTING AND INDEXING WATER QUALITY LEVELS

(71) Applicant: True Elements, Inc., Naples, FL (US)

(72) Inventors: William C. Louisell, III, Mt. Pleasant, SC (US); David Bankston, Naples, FL (US)

(73) Assignee: True Elements, Inc., Naples, FL (US)

( * ) Notice: Subject to any disclaimer, the term of this patent is extended or adjusted under 35 U.S.C. 154(b) by 493 days.

(21) Appl. No.: 17/698,765

(22) Filed: Mar. 18, 2022

(65) Prior Publication Data

US 2022/0300565 A1 Sep. 22, 2022

Related U.S. Application Data

(60) Provisional application No. 63/163,371, filed on Mar. 19, 2021.

(51) Int. Cl.
| | |
|---|---|
| *G06F 16/953* | (2019.01) |
| *G06F 16/906* | (2019.01) |
| *G06F 16/909* | (2019.01) |

(52) U.S. Cl.
CPC .......... *G06F 16/953* (2019.01); *G06F 16/906* (2019.01); *G06F 16/909* (2019.01)

(58) Field of Classification Search
None
See application file for complete search history.

(56) References Cited

U.S. PATENT DOCUMENTS

| | | | |
|---|---|---|---|
| 11,109,194 B1* | 8/2021 | Pinheiro | H04W 4/029 |
| 11,526,695 B2* | 12/2022 | Kothandaraman | G06N 20/00 |
| 2018/0270548 A1* | 9/2018 | Richter | H04Q 9/00 |
| 2022/0179661 A1* | 6/2022 | Kim | G06N 7/01 |

OTHER PUBLICATIONS

Mustafa, Hauwa Mohammed, et al. "Applications of IoT and artificial intelligence in water quality monitoring and prediction: A review." 2021 6th international conference on inventive computation technologies (ICICT). IEEE, 2021. (Year: 2021).*

* cited by examiner

*Primary Examiner* — Raymond L Nimox
(74) *Attorney, Agent, or Firm* — Michele V. Frank; Venable LLP

(57) ABSTRACT

Systems, methods, and non-transitory computer-readable storage media for predicting the water quality within a geographic area based on hydrology data, contaminant data, and/or weather data using Artificial Intelligence (AI). The system can receive hydrology data for a predefined geographic region and real-time sensor data associated with water quality within the predefined geographic region. The system can then initiate a serverless AI algorithm using the hydrology data and the real-time sensor data, then receive output of the algorithm including an initial water quality score. The system can then adjust the initial water quality score based on contaminants within the predefined geographic region and transmit the resulting water quality index score to a mobile computing device.

22 Claims, 23 Drawing Sheets

Physical Properties
Water Temperature (Deg F)
Salinity (PSS)
PAR Surface (uEin/m2)
pH (dim)
TSS (mg/l)
Turbidity (NTU)
Specific Conductance (umho)

902

Chemical Properties
NO2 as N (ug/l)
NO3 as N (ug/l)
N + NO2 + NO3 as N (ug/l)
Total N (ug/l)
Phosphorous as P (ug/l)
Phosphorous as P (mg/l)

904

Biological Properties
BOD (mg/l)
DO (mg/l)
Enterococcus (cfu/100ml)
Fecal Coliform (cfu/100ml)
Pheophytin-a (ug/l)
TOC (mg/l)

906

Radiological & Metals Properties
In Work

908

Land Properties
HUC Center Geo-Loc (Lat/Long)
HUC & County Boundaries (dim)
HUC Area (acres)
Prevailing Elevation (ft)
Prevailing Slope (%)
Hydrologic Outflow (Lat/Long)
Land Use Class Distribution (%)
Land Use Class Centroid (Lat/Long)

910

Soil Properties
Prevailing Hydrologic Soil Group (A-D)
Soil Chemical Adsorption Kf or Koc (dim)
EDDI (dim)

912

Storm Properties
Rain
Recurrence Interval (yrs)
Quantity (in)
Intensity (in/hr)
Snow
Accumulation (in)
Residual Snow-Pack (in)

914

Stream Properties
Stream Gauge (ft)
Flood Stage (ft)
Surface Elevation (ft)
Tidal Influence (ft)
Discharge (cu ft/sec)
Velocity (ft/sec)

SYSTEM AND METHOD FOR PREDICTING AND INDEXING WATER QUALITY LEVELS

PRIORITY

The present disclosure claims priority to U.S. Provisional Patent Application No. 63/163,371, filed Mar. 19, 2021, the contents of which are incorporated herein in their entirety.

BACKGROUND

1. Technical Field

The present disclosure relates to predicting water quality levels, and more specifically to filtering Artificial Intelligence results based on detected contaminants to provide an indexed water quality level.

2. Introduction

The health and welfare of individuals, communities, natural resources, business, government, and industry depends on sustainable water quality. The contemporary examples of human and economic devastation as a result of water quality failures are well known. There currently exists significant disparate and unstructured data on the present state of water in any given location. What has been conspicuously absent to date is any process, software, or any other viable tool capable of forecasting water conditions with scientifically reliable accuracy.

Forecasting the quality of water is a complex, multi-layered process. A technical problem of forecasting the water quality at any given location is obtaining relevant data about what is in the water sources which feed into that location, then processing that relevant data in a timely, accurate manner which can provide meaningful information to an end user. This problem is augmented by the geographic distances between sensors, differences in data collected by respective sensors, identifying the impact of various contaminants within the water supply, etc.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include, though is not necessarily limited to: receiving, at a computer system from at least one public database, hydrology data for a predefined geographic region: receiving, at the computer system from at least one Internet of Things (IOT) device, real-time sensor data associated with water quality within the predefined geographic region; initiating, via at least one processor of the computer system, execution of a serverless Artificial Intelligence (AI) algorithm using the hydrology data and the real-time sensor data; receiving, at the computer system, output of the serverless AI algorithm, the output comprising an initial water quality score; adjusting, via at least one processor of the computer system, the initial water quality score based on contaminants within the predefined geographic region, resulting in a water quality index score; and transmitting, via the computer system, the water quality index score to a mobile computing device.

A system for performing the concepts disclosed herein can include: at least one processor; and a non-transitory computer-readable storage medium having instructions stored which, when executed by the at least one processor, cause the at least one processor to perform operations comprising: receiving, from at least one public database, hydrology data for a predefined geographic region: receiving, from at least one Internet of Things (IOT) device, real-time sensor data associated with water quality within the predefined geographic region; initiating execution of a serverless Artificial Intelligence (AI) algorithm using the hydrology data and the real-time sensor data; receiving output of the serverless AI algorithm, the output comprising an initial water quality score: adjusting the initial water quality score based on contaminants within the predefined geographic region, resulting in a water quality index score; and transmitting the water quality index score to a mobile computing device.

A non-transitory computer-readable storage medium configured as disclosed herein can have instructions stored which, when executed by at least one processor, cause the at least one processor to perform operations which include: receiving, from at least one public database, hydrology data for a predefined geographic region; receiving, from at least one Internet of Things (IOT) device, real-time sensor data associated with water quality within the predefined geographic region; initiating execution of a serverless Artificial Intelligence (AI) algorithm using the hydrology data and the real-time sensor data; receiving output of the serverless AI algorithm, the output comprising an initial water quality score; adjusting the initial water quality score based on contaminants within the predefined geographic region, resulting in a water quality index score; and transmitting the water quality index score to a mobile computing device.

BRIEF DESCRIPTION OF THE DRAWINGS

FIG. 9 illustrates examples of databases used to predict water quality;

FIG. 15 illustrates an example of contaminant lists and regulations regarding water quality;

DETAILED DESCRIPTION

Figure 1:
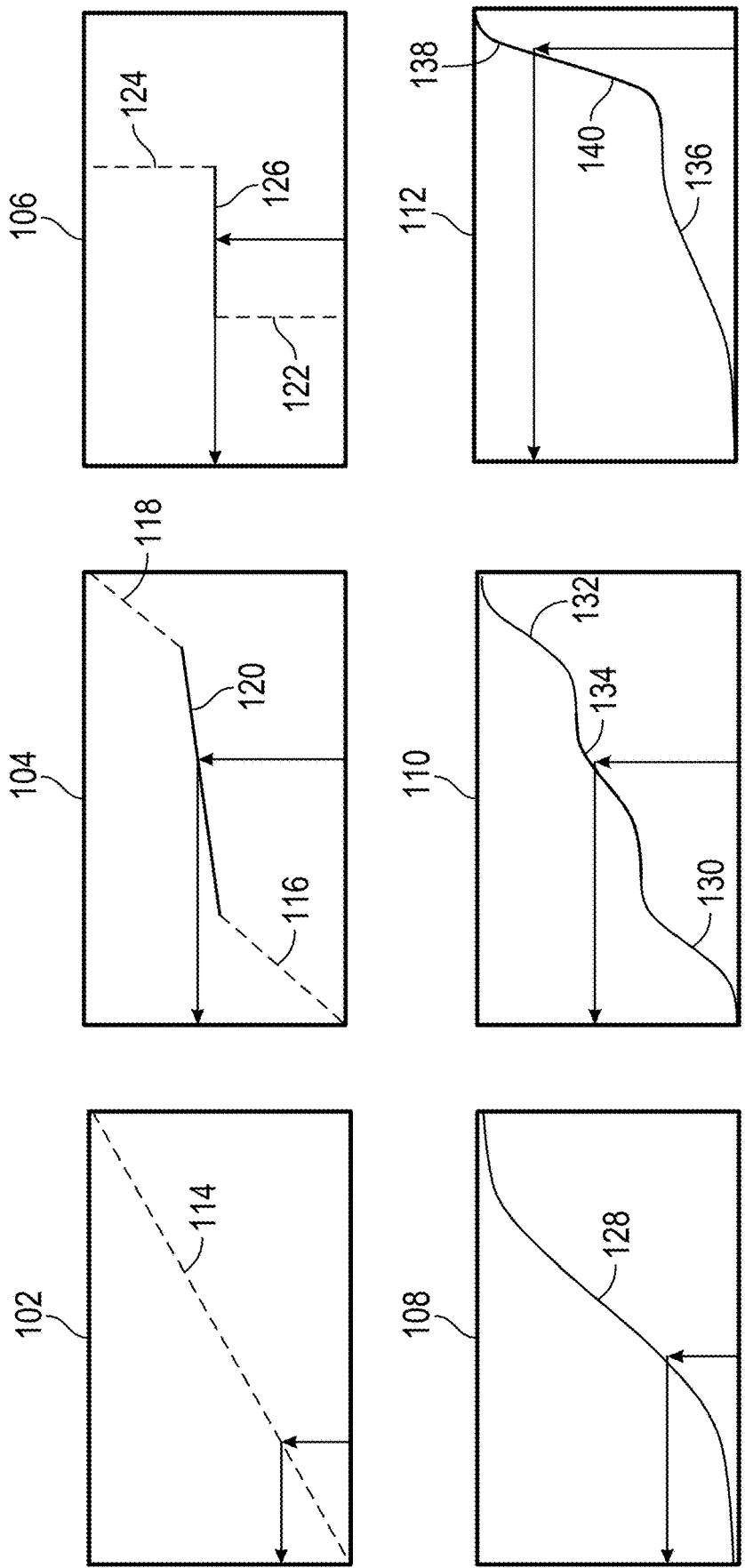
FIG. 1 illustrates an example of continuous function generation for effects of a specific contaminant.

Various embodiments of the disclosure are described in detail below. While specific implementations are described, it should be understood that this is done for illustration purposes only. Other components and configurations may be used without parting from the spirit and scope of the disclosure.

Disclosed herein are various configurations and embodiments of methods, systems, and non-transitory computer-readable storage mediums which utilize computationally efficient Artificial Intelligence systems to analyze water quality, resulting in predictions that can be readily used to save expensive resources and preserve the health and welfare of all end users.

One exemplary, non-limiting, practical application to the technical problem noted above is to receive current hydrology, in-situ water quality, agricultural, stormwater, industrial, water treatment, wastewater treatment land use, and soil data, from sensors dispersed within a geographic area, and discharge permit compliance reports which feed the water supply of a given location; normalize the data collected; input the normalized data into an AI (Artificial Intelligence) engine; receive output from the AI engine in the form of an initial water quality level for the given location; identify contaminant levels within the water supply for the given location; decrement or increment the initial water quality level based on the forecast contaminant load levels, resulting in an indexed water quality level: and output a recommendation mitigation strategy based on the indexed in-situ water quality level and/or the indexed forecast water quality level itself.

In practice, each individual step is a technically complicated process. For example, collecting current hydrology data from sensors dispersed within a geographic area (aka watershed) for a given geographic location requires wired or wireless sensors providing data in a periodic manner, coupled with precise information about the location of the sensor. In addition to real-time sensor data, the data may be obtained from disparate public and/or private databases, as well as IOT (Internet of Things) devices (public or private) (such as intake monitoring devices, discharge monitoring devices, product embedded sensors including smart showers, smart faucets, smart toilets, etc.). The sensors at the scattered geographic locations within the geographic area, the disparate databases, and/or the IOT data may or may not provide consistent data, such that the recipient of the data may need to adjust, "fill in," or otherwise compensate for missing data points. Such normalizing or "filling in" of the data can go beyond simply averaging neighboring data, and include information about known agricultural runoff (and/or information about other pollutants or contaminants), stormwater runoff, slope/elevation data, weather predictions, use of historic data, use triangulation and/or time-series generation methods, etc., to predict what the missing data is likely to be. In some configurations, systems configured as disclosed herein can implement a feedback system, such that the mechanisms used to make predictions of missing data are periodically updated (e.g., machine learning), resulting in future iterations of the normalized data having refined predictions because the factors used to make the predictions have been modified. Such modifications to the predictive factors can, for example, be identified using regressions or other mechanisms for adjusting which factors most heavily influence the predicted missing data.

The A.I. engine can be implemented on a cloud computing system such as AMAZON WEB SERVICES (AWS), allowing the system to only use the computational resources required at a given moment. That is, such configurations can request and use additional computing resources when additional computing is required, and relinquish those computing resources when no longer needed, such that systems configured as disclosed herein can save energy by only using computing resources when required and results in a more computationally efficient system for predicting water quality than systems which have dedicated servers. The A.I. engine can also have individual computing sections/modules which individually make predictions, the outputs of which are then combined together to make predictions for a given location.

Core to the indexing system is the ability to automatically generate a continuous mathematical function that relates a level of concentration of a given contaminant, or a combination of contaminants, with a level of significance, illustrated in FIG. 1. The level of significance can, for example, indicate how much harm may be conveyed to an individual in contact with the respective contaminant. In its base form the function can be displayed on a cartesian plane such that for a given concentration (x-axis), a given level of significance (y-axis) can be found. In the case where two points are discovered via reference to authoritative data (e.g., the EPA, Industry Publications, Research Publications, Manufacturer's Material Safety Data Sheet, etc.) a line function can be formed. As more points of concentration to significance relationships are discovered, the function shape may change to conform to provide an x-to-y relationship that reflects the evolving data. In this case, introduction of new data in a specific dimension, the AI engine will reform the function shape to reflect the data revealed changes to the cartesian relationship. The level of significance for any given contaminant or combination of contaminants may be multi-dimensional and/or multi-tiered. The significance may, for example, be a measure of toxicity in one or more dimensions associated with type of contact, such as exposure by mouth, exposure by inhalation, exposure by skin contact, or any defined combination.

Further, the AI engine can track the level of severity for a given chemical interaction by level of harm indicated by an authoritative source. For example, if the system obtains information indicating different levels of harm caused by different levels of exposure, the AI engine can generate a continuous mathematical function which emulates those levels. For example, as illustrated in the top left graph 102 of FIG. 1, if the system were given two data points, the resulting mathematical function may be a linear function with a linear significance line 114, indicating that the potential results for exposure to the contaminant increase linear based on exposure. A system configured as disclosed here can simultaneously, for a contaminant of concern, track the impact of a particular concentration on at least three levels—by a single dimension (type of contact), by multiple dimensions, and on multiple tiers (where the type of harm changes when the level of significance and/or the exposure to a contaminant increases to a predetermined level).

When additional data points are retrieved (via download from a website, scraping data from a website, or other means), the system can update the previous mathematical functions to account for the updated data. In the top middle graph 104, the system updates the equation with new data points 120, such that the lower 116 and upper 118 points of exposure are updated to conform with previous data.

In another graph 106 is illustrated an example of a step-function response to exposure to a contaminant. In this example, any exposure to this contaminant will result in an immediate result (illustrated by the vertical line 122). Then there is a portion where additional data 126 is showing that additional exposure to a particular contaminant does not result in additional harm—to a point. Once that point is reached, the subsequent exposure again results in immediate results, illustrated by the second vertical line 124.

In some instances, the resulting mathematical functions may be non-linear, as illustrated in the three bottom examples 108, 110, 112. As illustrated in 108, the contaminant significance may be curvilinear 128, with portions of the resulting function having sections which are essentially linear, and other sections which are curved. Likewise, in example 110, there may be portions which are known 134, and other sections 130, 132 where the system uses the equations of the known section 134 to form the overall equation. In yet another example 112, the system may gather known information 136, 138, but be missing a portion of data which implies a large increase 140 in the significance of impact. In this case the AI engine can form the missing portion 140, resulting in a continuous equation taking account of all known data.

To constantly update the data, the AI engine continuously obtains evolving data from databases and/or web scraping websites. With that data, the AI engine can assign the dimension or dimensions and tier or tiers to a respective contaminant, such that the equations relating concentration to significance can be continuously and simultaneously adjusted across each dimension and/or tier simultaneously.

To support computational efficiency, the applicable function for a specific contaminant can be formed on the fly to form a single base equation which responds in terms of shape to a contaminant, a type of interaction (dimension), and/or a tier specific vector (type of harm) stored as a single-, double-, triple-, or quad octet in which each position can be filled with an integer value between 0 and 9.

Figure 2:
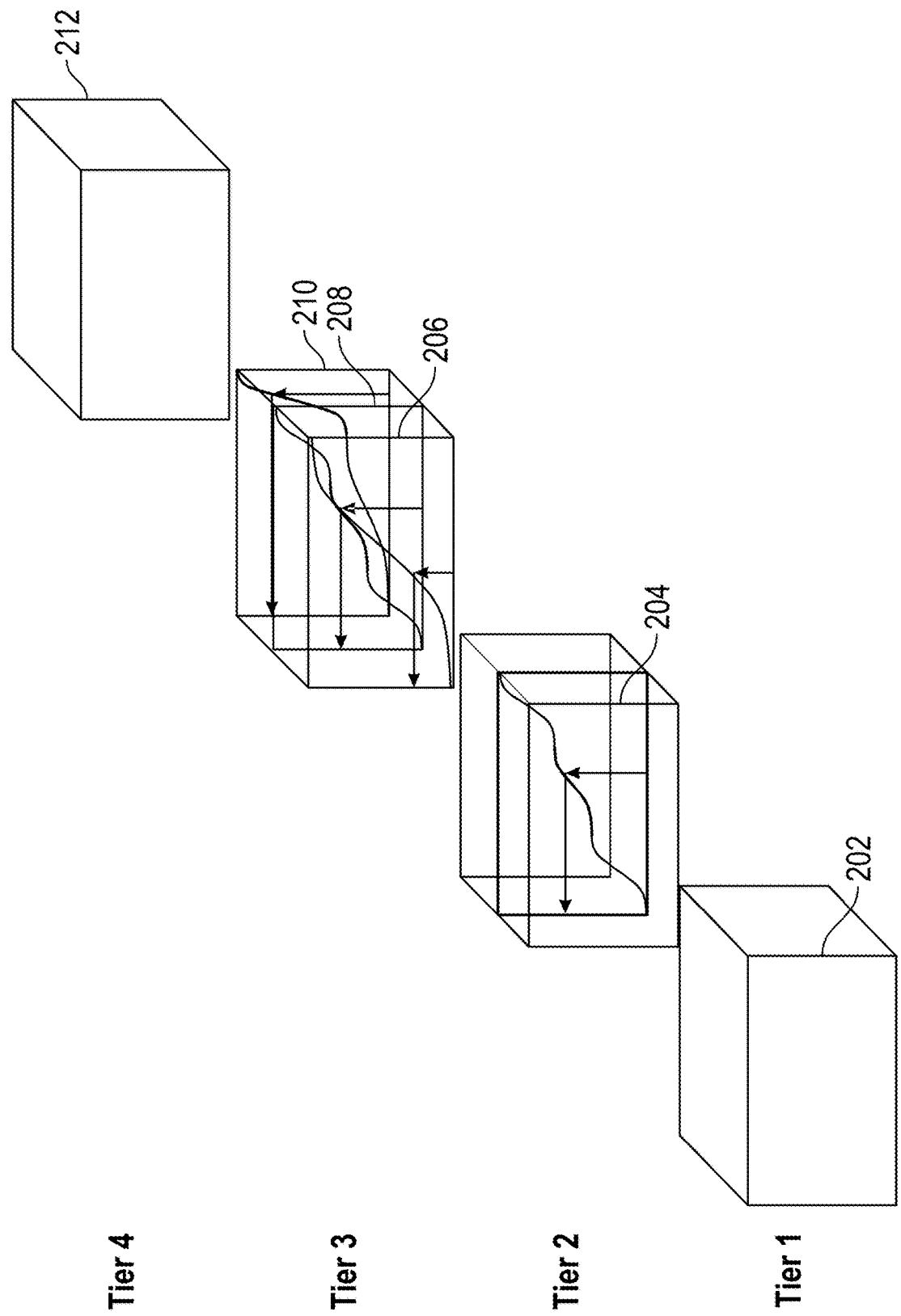
FIG. 2 illustrates an example of multi-dimensional effects for multiple contaminants.

As illustrated in FIG. 2, in the case of discovery of data indicating that the contaminant of concern has impacts on multiple dimensions of significance, the AI engine can generate a cartesian relationship in each discovered dimension such that the individual and or combinatorial effects on human health and life safety can be individually tracked and simultaneously generated and delivered to the final indexing algorithm as an input. For example, in Tier 1 202, there may be no known impacts due to contact with a contaminant. In Tier 2, we see a single known type of health impact (and its equation 204) due to contact with a contaminant. In Tier 3, multiple equations/graphs exist 206, 208, 210, providing information regarding health impacts for different types of interactions. Tier 4 may represent another level of impact, where any contact 212 with the contaminant would result in serious harm to the individual.

Identifying future contaminant levels within the water supply (and their impact on water quality) for a given location can, in some configurations, be part of the A.I. engine. In other configurations, identifying the presence and impact of contaminants can be a distinct, separate process. The identification of contaminant levels can, for example, involve the use of historical data: known activities and locations of agricultural areas including crop cycles and associated nutrification, herbicide treatments, and pesticide treatments; stormwater outfalls and associated seasonal contaminant constituency: industrial sites and associated contaminant constituency, water treatment plants and associated practices, wastewater treatment plants, and associated practices, etc.: hydrology within the watershed; current and/or predicted rainfall; seasonal variance data; use triangulation and/or time-series generation methods: and/or other data descriptive of the constituency, toxicity, and volume of discharges. Collection of such data makes use of public/private databases, public/private sensors, public/private IOT devices, and public/private hydrographic and hydrologic data described above.

The system can use the identified contaminants loads to establish the initial water quality via the A.I. engine, resulting in an indexed water quality level. In practice, the system can identify the type and/or level of harm which can be caused by each contaminant, and reduce the overall water rating based on the amounts of detected contaminants coupled with their respective type/level of harm. The system can use sources such as EPA (Environmental Protection Agency) databases, industry publications, research publications, manufacturer's Material Safety Data Sheet (MSDS), etc. The result is an indexed water level quality readily understood by expert and non-experts in water quality.

In some configurations, based on the types of contaminants and/or the indexed water quality level, the system can also output a recommendation regarding how a user may react to the indexed water level quality. For example, the system can access an online database of a vendor of water filters, identify which of the water filters is proper for a found contaminant (or combination of contaminants), identify the inventory level of the vendor, and make a recommendation to the user that they purchase the found filter to improve water quality given the specific contaminant constituency identified within the user's water supply. In addition (or alternatively), the system can output the indexed water quality level itself to a user. For example, if the index extended from a "100" for perfectly pure water to "0" for completely contaminated water, the system can output the indexed score to the user, with or without explanation for the various contaminants found in the water or other reasoning for the score.

Systems configured as disclosed herein retrieve and process information in ways impossible for human beings. For example, retrieval of data from sensors scattered over a geographic area, accessing disbursed databases, and performing computations using a serverless computing system all require access to a computer network, such as the Internet, comprising tangible servers and other data storage devices. In addition to the data collection process requiring tangible tools for implementation, systems configured as disclosed herein to normalize data, assign temporal and spatial tags, and assign data instructions as to the joining vectors with other data elements and to routing instructions to destination applications within the A.I. engine suite. To improve data analysis and processing of the collected information a feedback loop is employed to iteratively improve the predictions made with respect to realized storm effects, realized contaminant loading, realized contaminant transport, realized time of arrival, realized duration and intensity of impact, etc.; while constantly reducing the energy and computational expenditure by using serverless instances to execute on the data.

Figure 3:
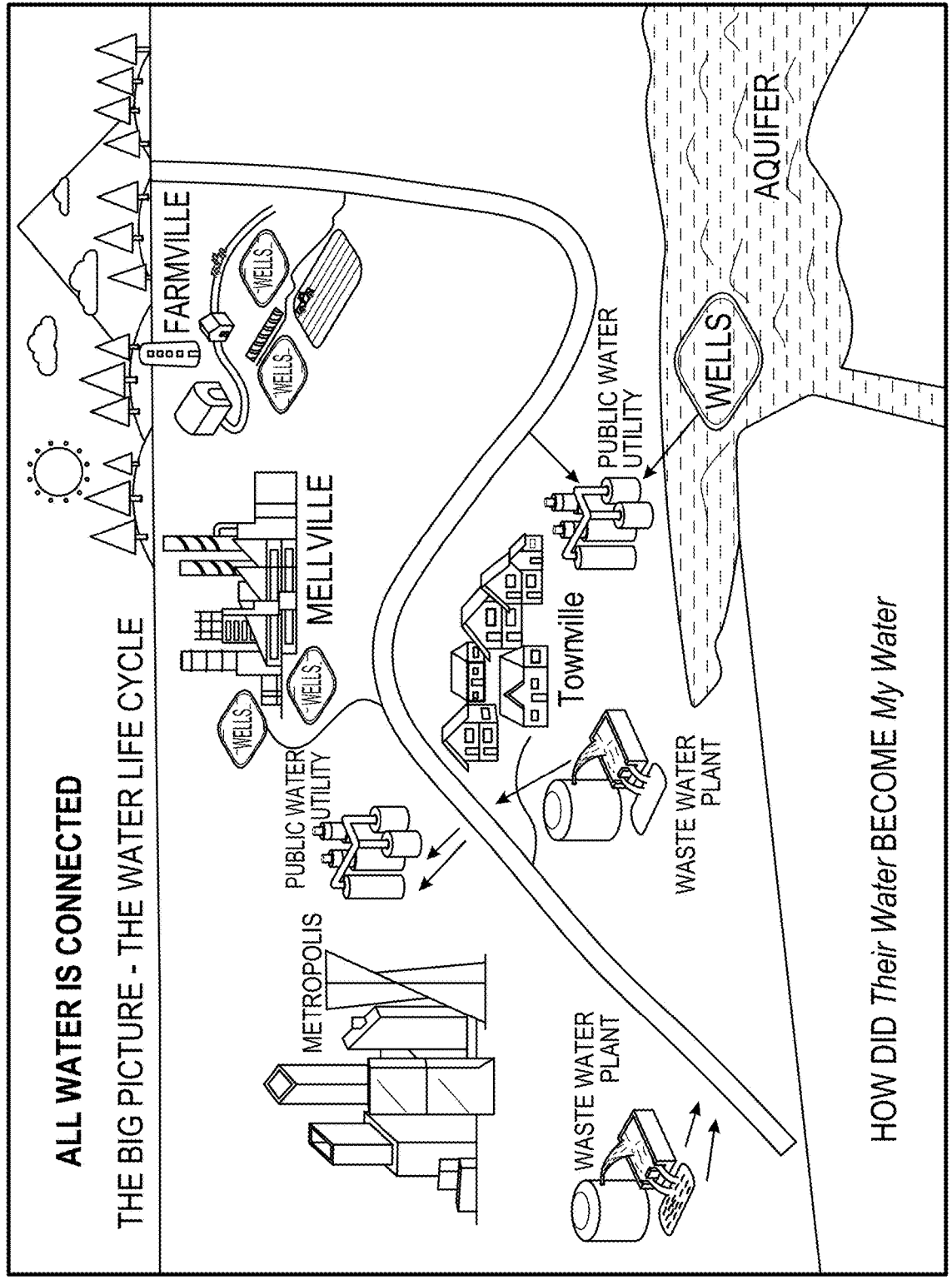
FIG. 3 illustrates an example of water interconnectivity.

FIG. 3 illustrates an example of water interconnectivity. As illustrated, water flows from mountains and may pass by farms, industrial centers, suburbs, major cities, etc., and encounters wastewater treatment plant discharges. In the example illustrated, the wastewater output by one city or industry will influence the source water for another, such that how respective entities receive, treat, and otherwise use their water can be of great concern.

Figure 4:
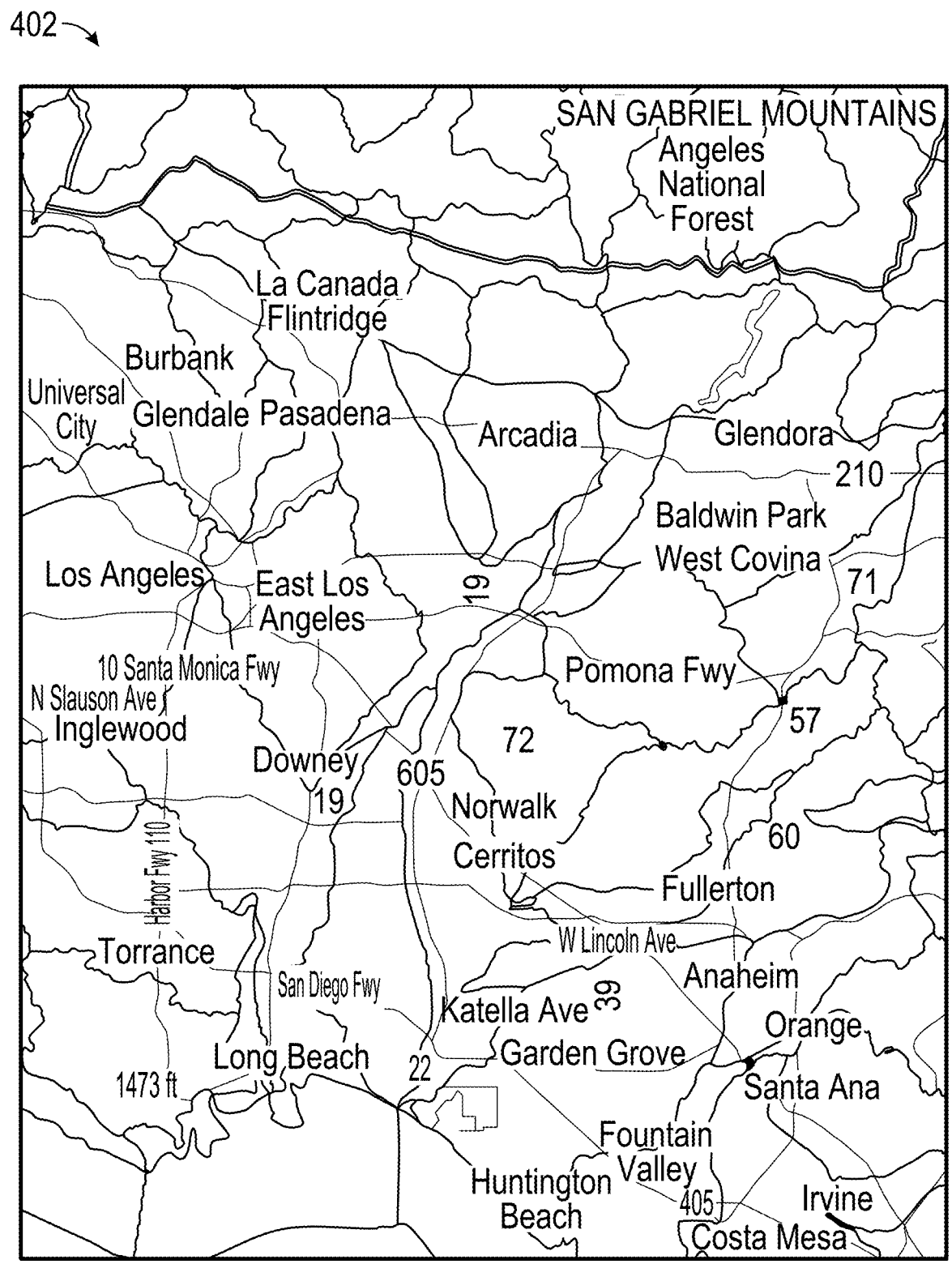
FIG. 4 illustrates an example hydrology map.

FIG. 4 illustrates an example hydrology map. A hydrology map, such as the one illustrated, identifies how water flows within a geographic area, and can include geographic coordinates (such as latitude and longitude), as well as water flow direction in cardinal (e.g., the water is flowing South), bearing, and/or azimuth formats. The hydrology map may also include information regarding the elevation of respective points and/or the slope of the topography associated with each point, such that predictions of how the water would flow and/or how fast the water would flow can be made.

Figure 5:
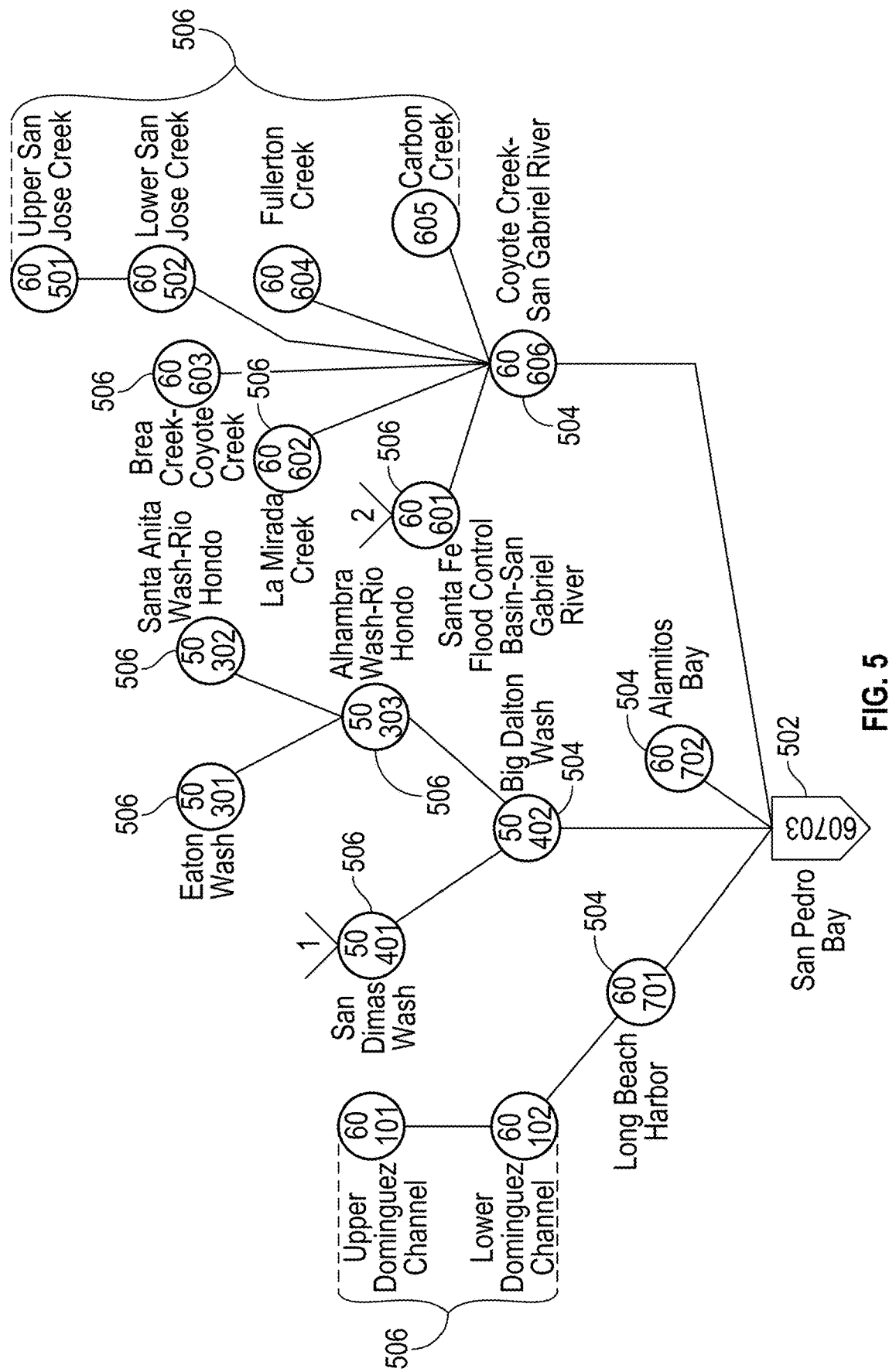
FIG. 5 illustrates an example of process nodes.

FIG. 5 illustrates an example of process nodes 502, 504, 506. The process nodes illustrate how the various portions of a hydrology map combine together, with each section of a hydrology map corresponding to a respective node within a tree. As the water moves toward the ocean 502, the process nodes combine together, allowing a visualization of how the respective portions of the hydrology map combine together. As illustrated, some nodes 504 directly feed into the ocean 502, whereas other nodes 506 combine with other nodes prior to reaching the ocean 502.

Figure 6:
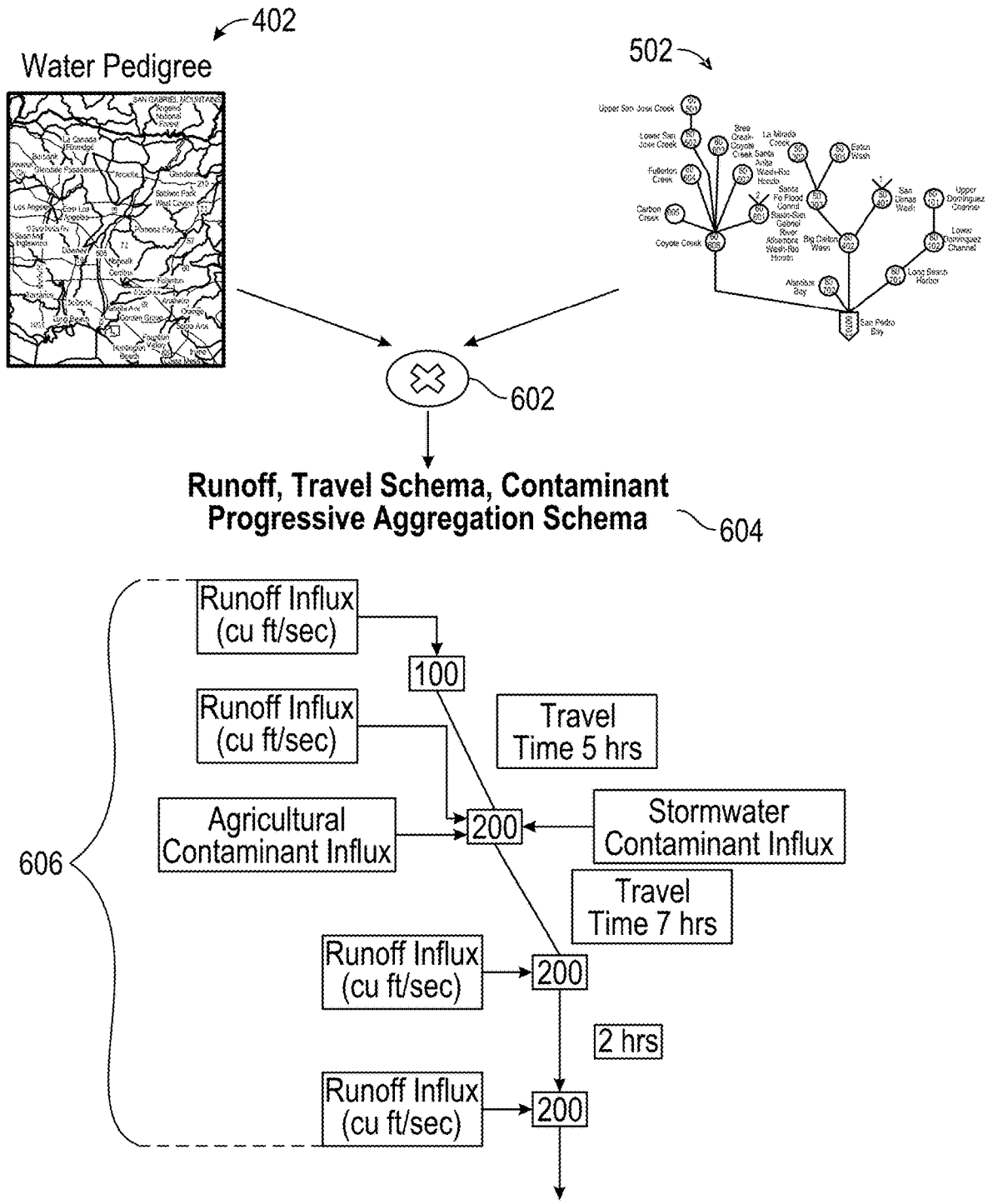
FIG. 6 illustrates an example water pedigree.

FIG. 6 illustrates an example water pedigree, formed by combining 602 the hydrology map 402 information with the process nodes 502. The combined pedigree can be used to calculate runoff, travel schema, and/or the aggregation of contaminants 604. Using a formed water pedigree, known precipitation levels, seasonal information, etc., the system can make predictions 606 about how what contaminants will be in the water and how fast those contaminants will arrive at a downstream location.

Figure 7:
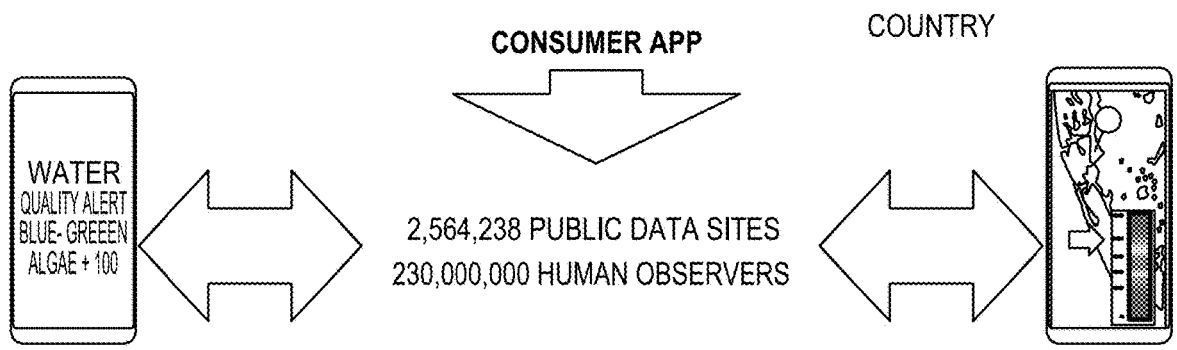
FIG. 7 illustrates examples of water alerts operating through a consumer app.

FIG. 7 illustrates examples of water alerts operating through a consumer app, which can be deployed on a smartphone, tablet, desktop computer, and/or any other computing system. As illustrated, the consumer app can interact with human observers and/or public data sites to provide water quality index scores to users. On the left is illustrated a water quality alert where the score is a "blue-green," and the app also provides a side effect of the water quality, "Algae+100." On the right is illustrated the spectrum of possible water quality levels and the current predicted level, with a map showing a pin of where the water quality is being predicted.

Figure 8:
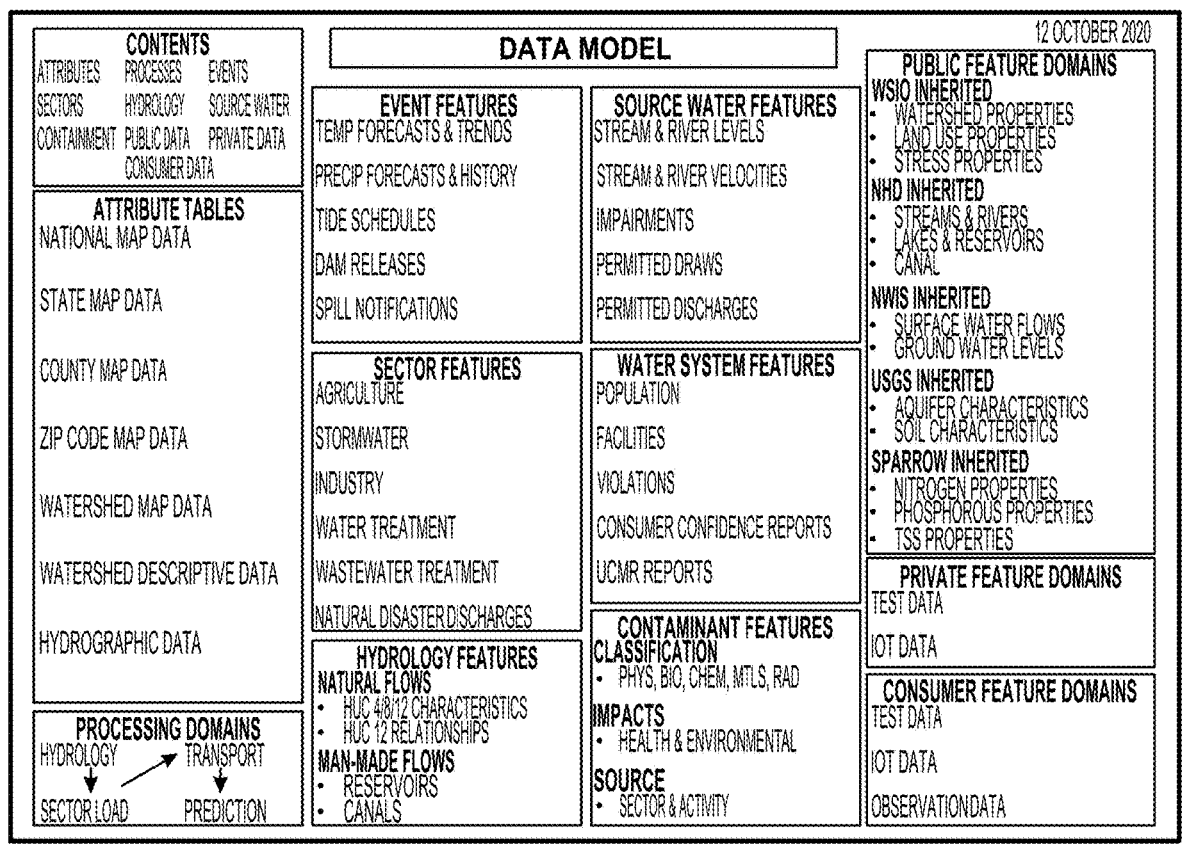
FIG. 8 illustrates an example data model.

FIG. 8 illustrates an example data model. This example model provides overview of all of the different data types and data sources which can be used to execute the disclosed algorithms and make the disclosed predictions. As illustrated, some of these resources can be stored in public databases, others private databases; some of the resources can be created and stored by a system configured to generate and produce such resources, other resources can be created, stored, and accessed remotely via the system.

FIG. 9 illustrates examples of databases used to predict water quality. For example, at any given location, the properties which may be used to predict water quality may include physical properties 902, chemical properties 904, biological properties 906, radiological properties 908, metallic properties, land properties 910, soil properties 912, storm properties 914, and/or stream properties 916. In some configurations only some of these databases may be used, whereas in other configurations other databases may be used.

Figure 10:
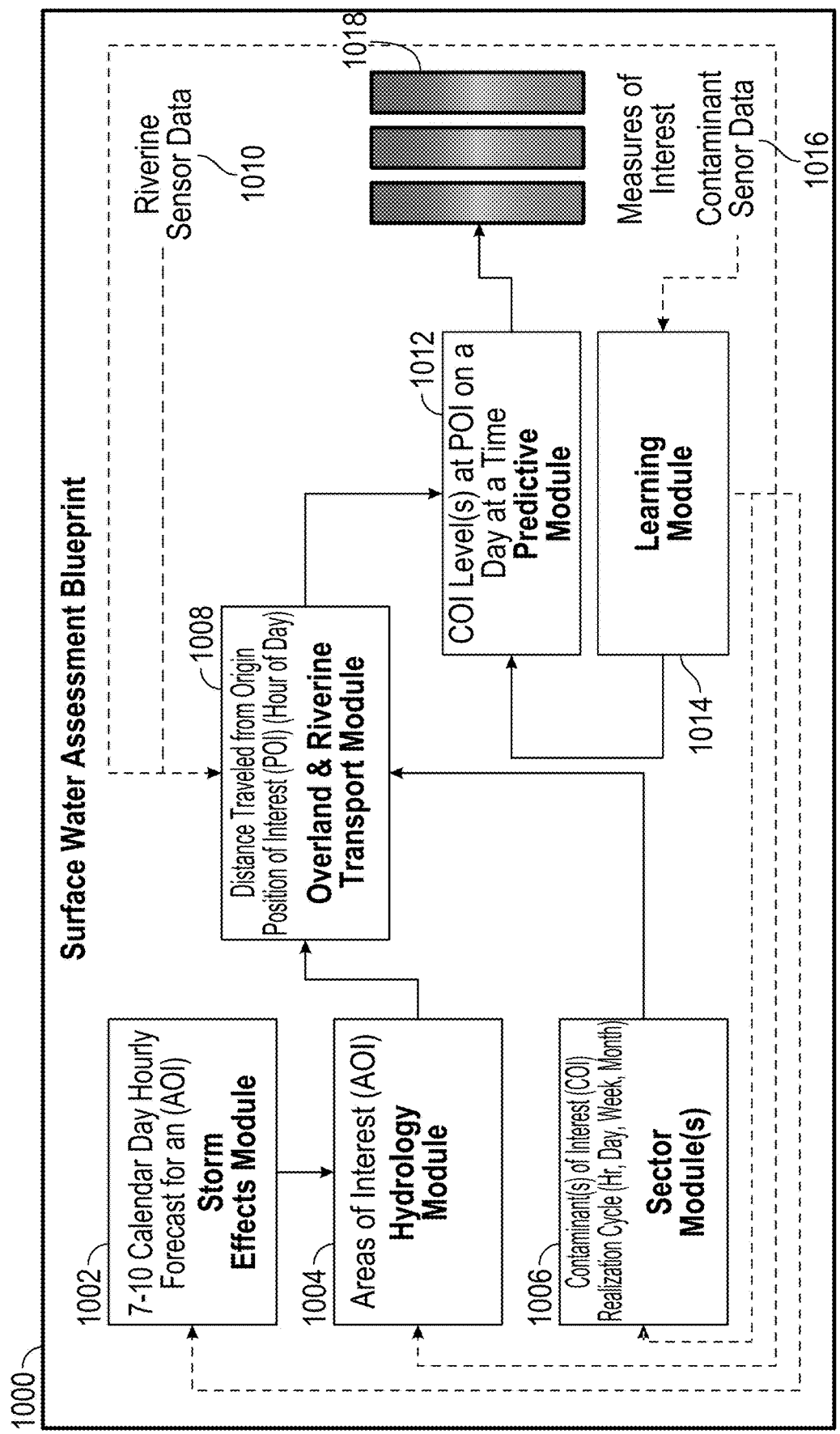
FIG. 10 illustrates an example of an A.I. engine for predicting water quality.

FIG. 10 illustrates an example of an A.I. engine 1000 for predicting water quality. The illustrated A.I. engine 100 has multiple exemplary modules (a "Storm Effects" module 1002 which can access hourly weather forecasts; a "Hydrology" module 1004 which can access hydrology databases: "Sector" module(s) 1006 which can identify potential contaminants of interest (COI) which may be present in a given geographic area based on hour, day, week, or month; an "Overland & Riverine Transport" module 1008, which can use sensor data 1010 to calculate the distance traveled from an origin Position of Interest (POI) based on hour of day; a "Predictive" module 1012 which can calculate water quality based on contaminant levels and the output of the Overland and Riverine Transport module 1008; and a "Learning" module 1014 which can use feedback mechanisms to modify the algorithms of the Predictive module 1012 and/or other modules within the A.I. engine, and can further rely on contaminant sensor data 1016. The final output of the A.I. engine 1000 can be a measure of interest 1018, also known as a water quality index score.

The illustrated A.I. engine 1000 can be implemented using a computer system, such as a server, or a serverless computing system. The respective modules illustrated can be executed by distinct computing systems, or can be a single computing system executing distinct portions of a computer algorithm/code. In some cases, the distinct modules can be operated in parallel, using multi-core processors, distinct servers, etc.

Figure 11:
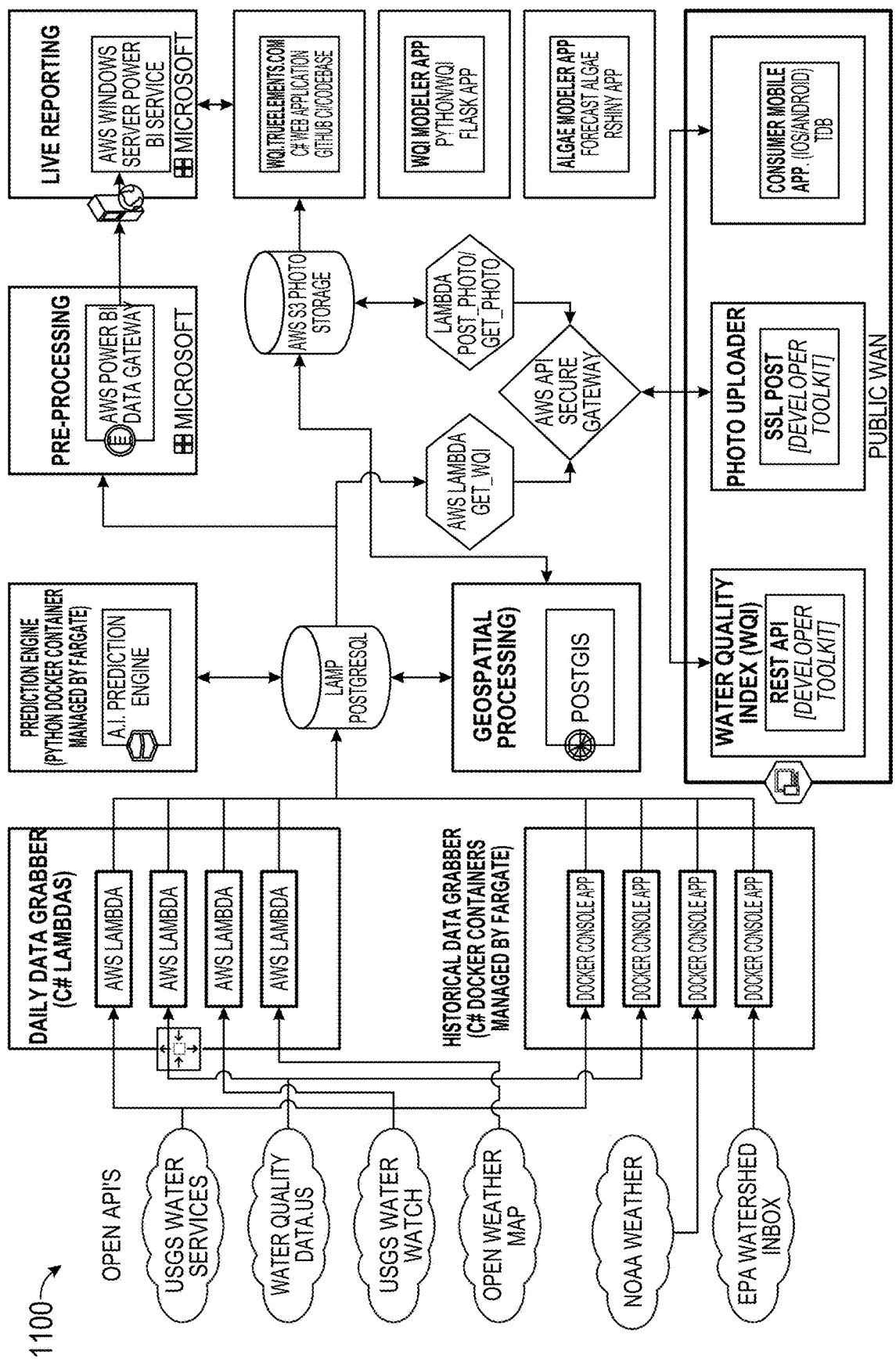
FIG. 11 illustrates an example of a server architecture for predicting water quality.

FIG. 11 illustrates an example of a server architecture for predicting water quality. In this example, the system accesses public databases using open APIs (Application Programming Interface). This data is gathered using functions such as AWS Lambda or other data grabber technology, then aggregated into a database, such as a "LAMP PostgreSQL" database. The database can also include Geospatial Processed data, as needed. From that database a number of distinct applications can be executed in parallel, such as an A.I. prediction engine and/or Live Reporting with associated pre-processing. The results of the various prediction algorithms and live reporting algorithms can be output as a Water Quality Index to apps, models, etc. Users can then access the predictions remotely across a network via terminal computing devices such as smartphones, tablets, or other devices.

Figure 12:
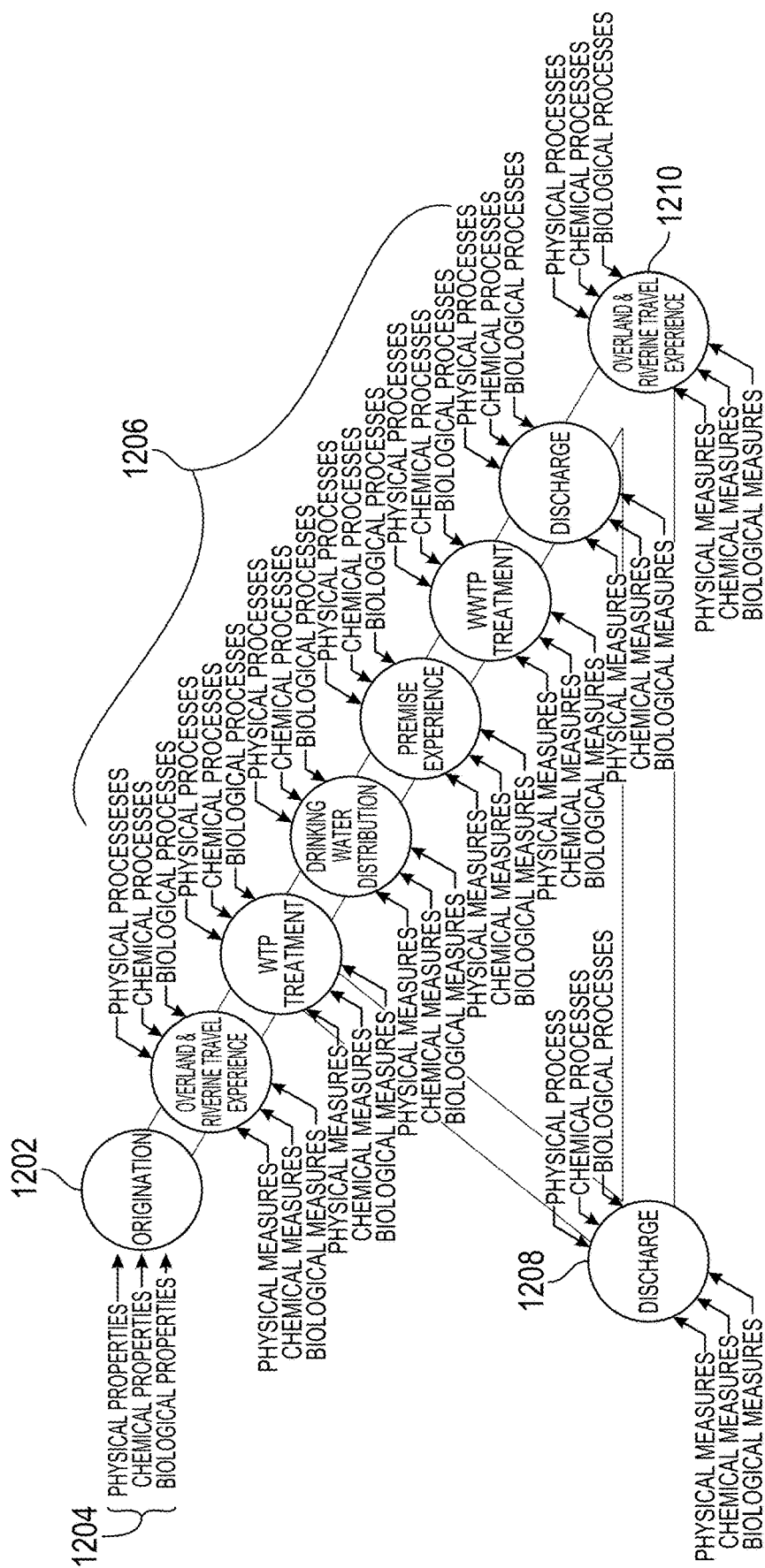
FIG. 12 illustrates examples of water properties at various points.

FIG. 12 illustrates examples of water properties at various points. The large circles represent the stages of water, and read: Origination 1202, Overland & Riverine Travel Experience, WTP (Water Treatment Plant) Treatment, Drinking Water Distribution, Premise Experience, WWTP (Waste Water Treatment Plant) Treatment (collectively 1206), Discharge 1208, and Overland & Riverine Travel Experience 1210. For each circle, there are (as illustrated) six factors: physical, chemical, and biological measures 1204 (illustrated on the left of each circle); and physical, chemical, and biological processes (illustrated on the right of each circle). These measures and processes illustrate how the system analyzes the water quality at a given location based on the water's previous stages and the inputs to those respective stages. Moreover, this figure illustrates that as water progresses further from source or origination, the number of factors and processes in determining the water quality become larger and more complex.

Figure 13:
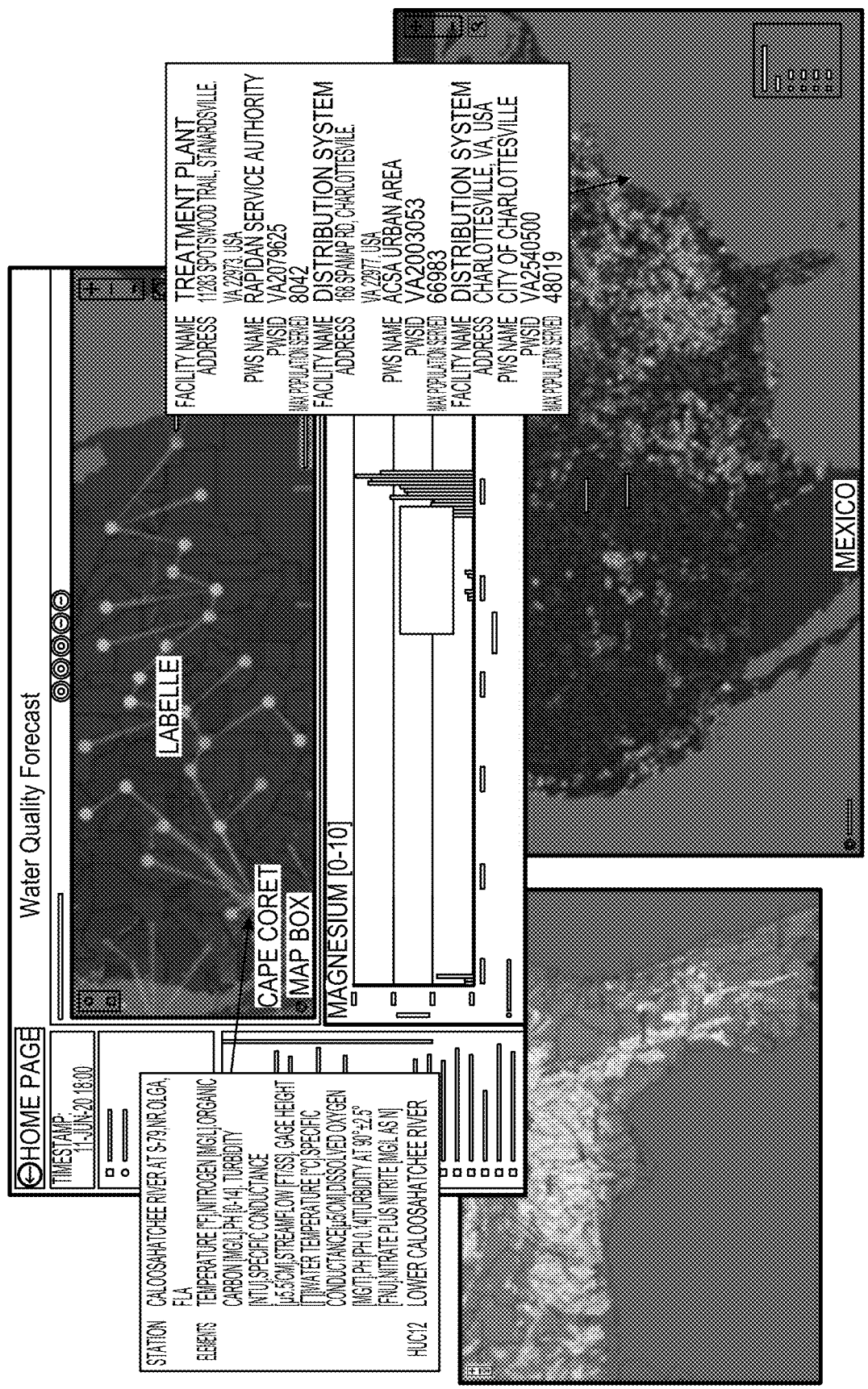
FIG. 13 illustrates an exemplary water quality platform.

FIG. 13 illustrates an exemplary water quality platform. This is the type of data which could be communicated to an end user, with the ability to show a current water quality level for any geographic location or area, the data sources accessed to determine a given location's water quality, contaminants located or predicted at a given location, etc.

Figure 14:
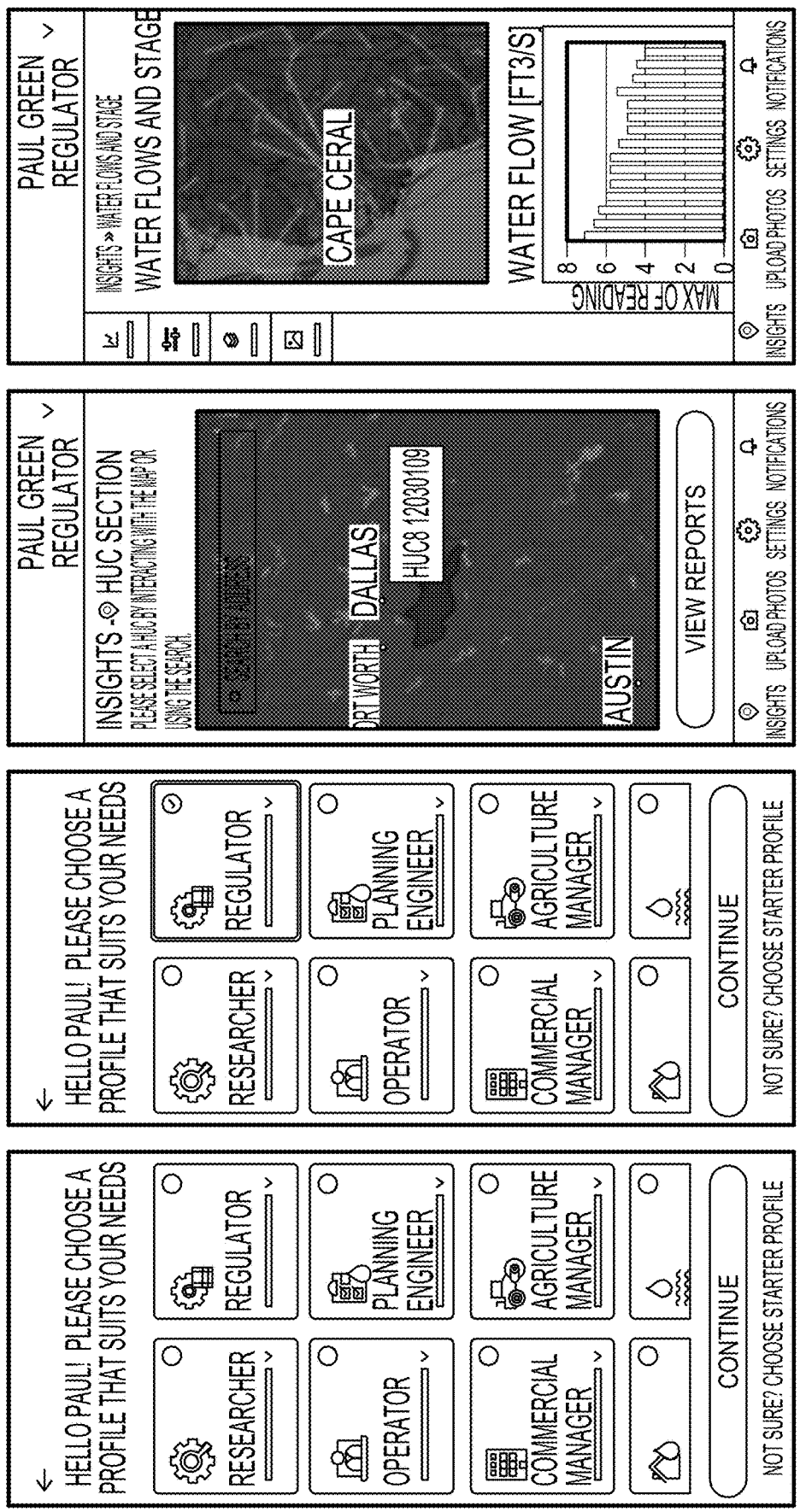
FIG. 14 illustrates example screens from a water quality app.

FIG. 14 illustrates example screens from a water quality app. As illustrated, the app can provide different content based on the profile of the user, and can show water flows, photos, water quality for a given location, and/or other data calculated or retrieved by the system.

Figure 15:
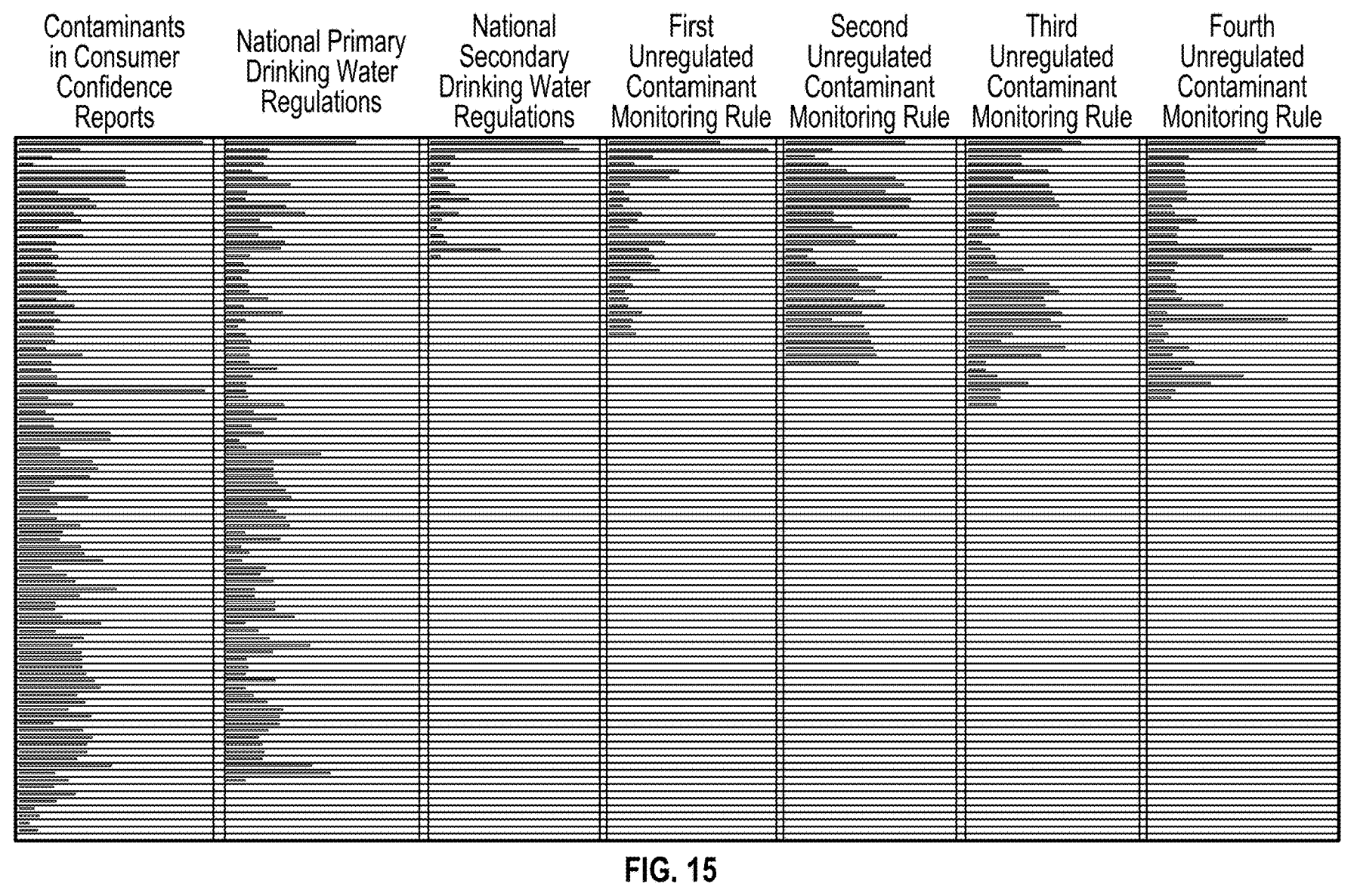

FIG. 15 illustrates an example of contaminant lists and regulations regarding water quality. Such data can be accessed by the system from databases, with each list containing names of contaminants according to various rules, regulations, and/or reports. For example, the system can retrieve a list of contaminants in a consumer confidence report, the list of contaminants according to one or more national drinking water regulations, and one or more lists of unregulated contaminants. In some configurations, the system can also retrieve lists of contaminants identified or tracked by certain states, provinces, counties, and/or other localities. These lists of contaminants can be used in determining the water quality level by the A.I. engine.

Figure 16:
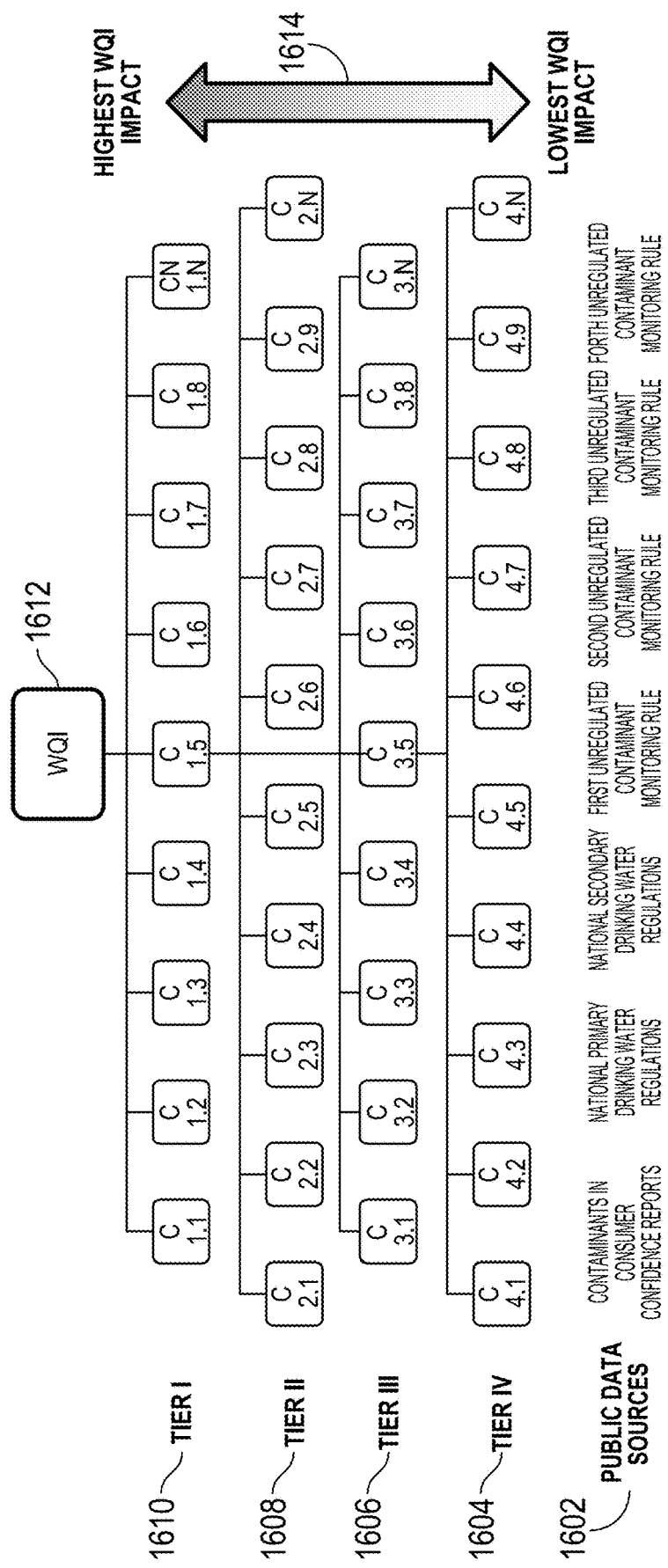
FIG. 16 illustrates a first example of water quality indexing based on tiered contaminants.

FIG. 16 illustrates a first example of water quality indexing based on tiered contaminants. In this example, the list of contaminants is tiered according to impact, with contaminants having a higher impact on water quality listed as "Tier I" 1610, and contaminants having less impact on water quality listed as tiers II-IV 1608, 1606, 1604. In other configurations additional tiers may be present. As described above, the lists of contaminants and their impacts can come from public data sources and/or private resources 1602, such as consumer confidence reports, regulations, monitoring rules, etc. Each of the contaminants will reduce the overall water quality index score, with contaminants from Tier I 1610 reducing the overall score more than contaminants from Tier II 1608, etc., if the quantity of the contaminants were equal. If the quantity of a Tier II 1608 contaminant were sufficiently high, it could possibly reduce the Water Quality Index score 1614 more than a minute amount of a Tier I 1610 contaminant.

Figure 17:
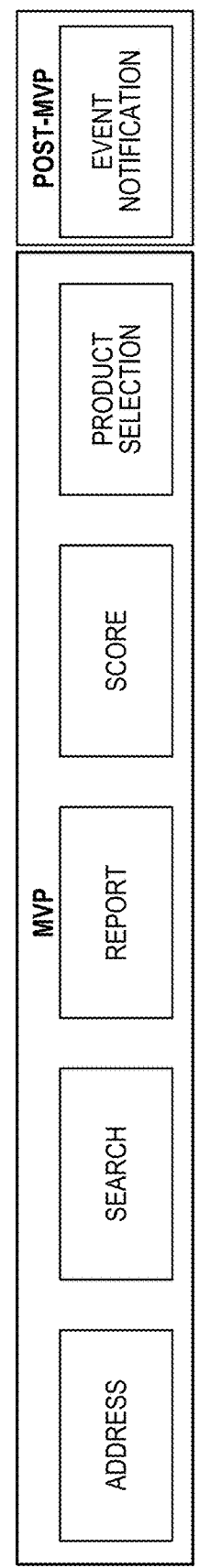
FIG. 17 illustrates an example of water quality indexing and associated recommendations.

FIG. 17 illustrates an example of water quality indexing and associated recommendations. In this example, the system retrieves an address for a particular geographic location, executes a search of known information about the geographic location (such as watershed information, water levels, contaminants, databases, etc.), produces a report on the retrieved information along with a score indicating the overall water quality for that location. The system can also access a database of an online vendor, identify what products they have which could help raise the water index score, and suggest that product to the user. For example, if the report indicates the presence of a particular contaminant, and the vendor has a filter which can remove that contaminant, the system may recommend that particular filter to the user. The system can also transmit an event notification, notifying the user of particular circumstances or situations regarding their water quality. For example, if the system detects that extreme rainfall in the mountains has led to flooding and additional contaminants within the downstream water supply, the system can generate and transmit an event notification to a user associated with a downstream address or location, thereby triggering a mitigation action suitable to minimize the impact of the particular contaminant constituency.

Figure 18:
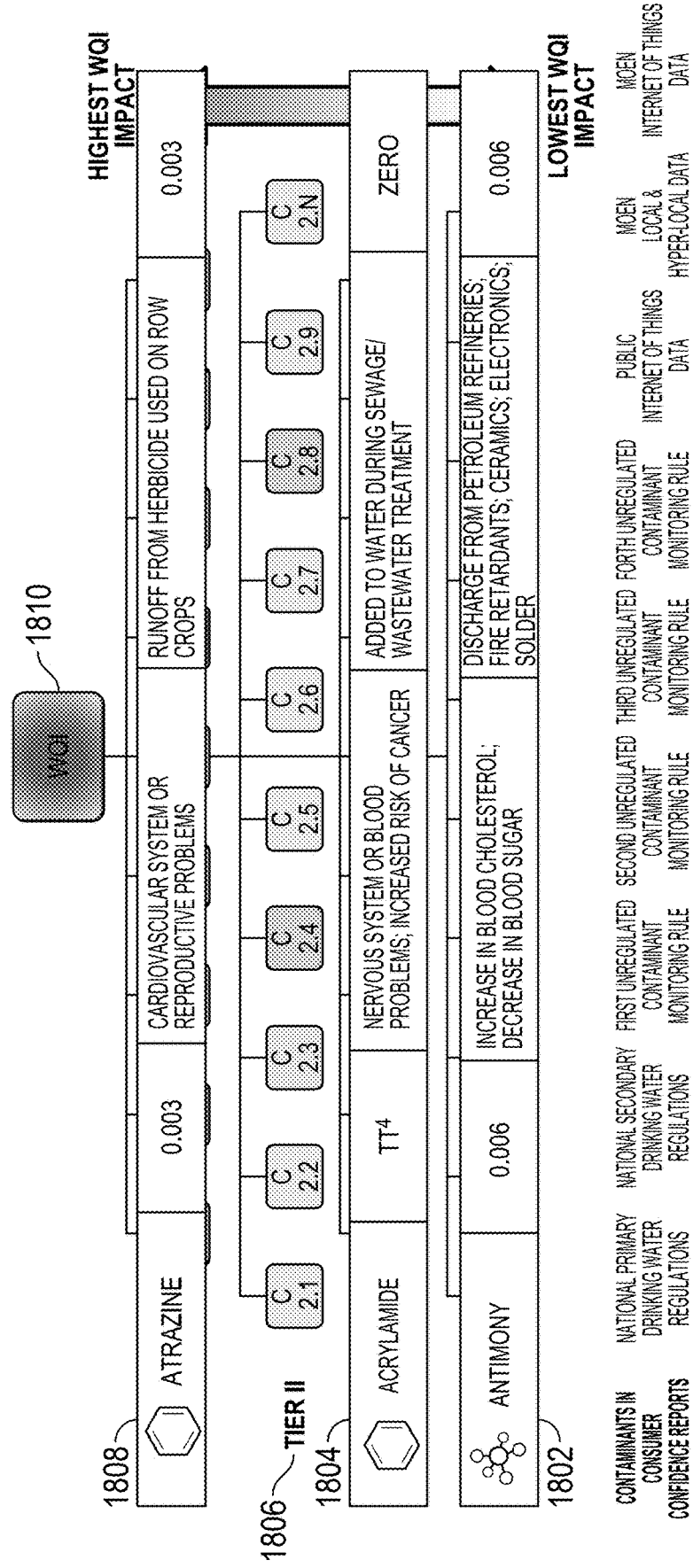
FIG. 18 illustrates a second example of water quality indexing based on tiered contaminants.

FIG. 18 illustrates a second example of water quality indexing based on tiered contaminants. In this example, various contaminants, having various levels of impact on human health, are detected in the water. For example, Atrazine 1808 is detected, which can have a high impact, as well as Antimony 1802, which has a relatively lower impact. Trace amounts of Acrylamide 1804 are detected, and because the amounts fall beneath established thresholds for harm, no impact from the Acrylamide 1804 is identified. Like the example of FIG. 16, the sources for the data 1602 which result in tiers can be public reports, databases, and/or other sources.

Figure 19:
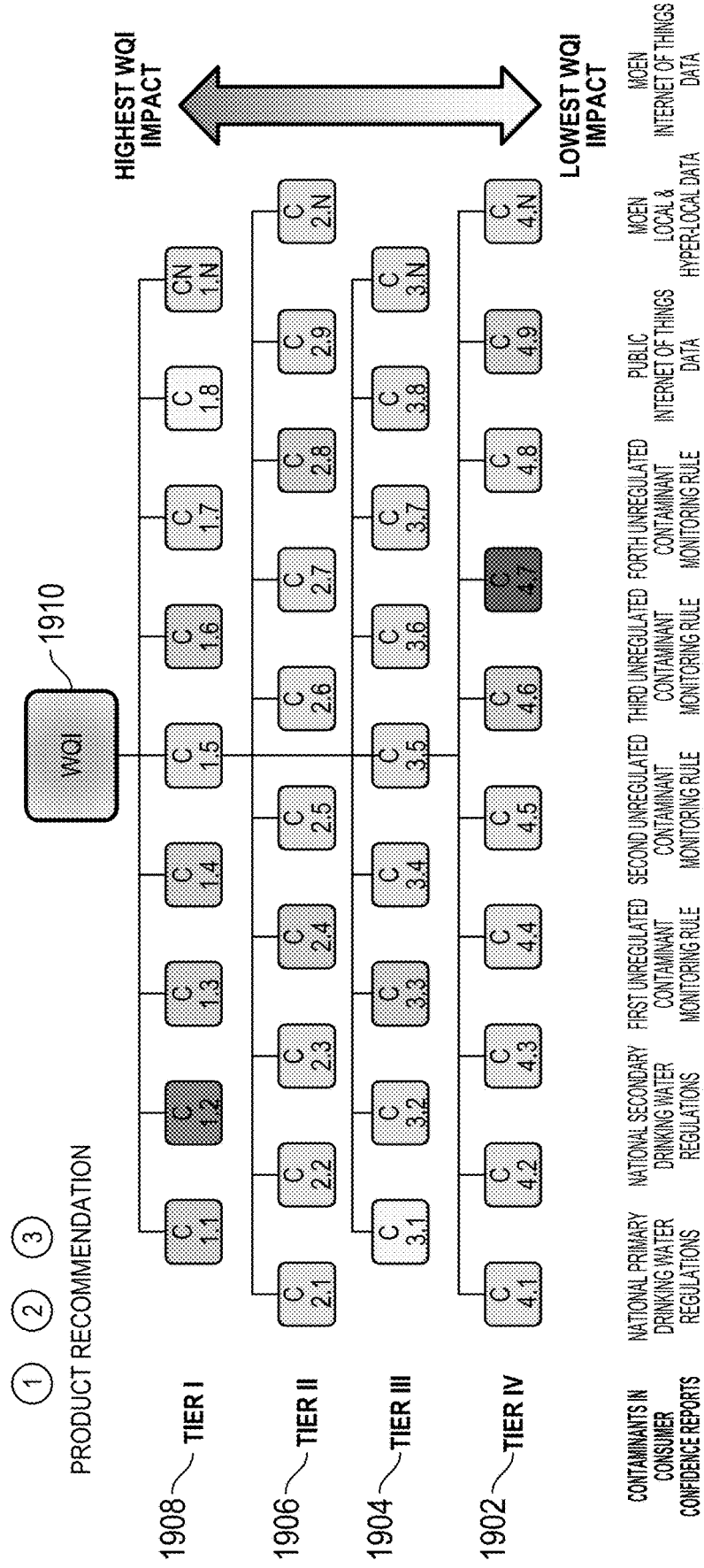
FIG. 19 illustrates a third example of water quality indexing based on tiered contaminants.

FIG. 19 illustrates a third example of water quality indexing based on tiered contaminants 1902, 1904, 1906, 1908, with the respective impacts of the detected chemicals illustrated. For example, a contaminant with high impact (based on both the amount detected as well as its tiered classification) is illustrated as darker, whereas a contaminant with relatively low impact is illustrated as having less shading. Again, the data used for the tiered classifications can come from public sources 1602.

The Water Quality Index score can, for example, be on a 0-100 spectrum, with "70" representing a passing score. In other configurations the Water Quality Index score can be a letter grade, such as "A" to "F". The MCGL (Maximum Contaminant Level Goal) for a particular location can be provided to users, and can vary from location to location as required for the particular filtration systems available at that location and the water usage. For example, the MCGL may differ between agricultural use and drinking water or other uses, based on the respective health and/or environmental impact of the contaminants on the particular use in question.

Figure 20:
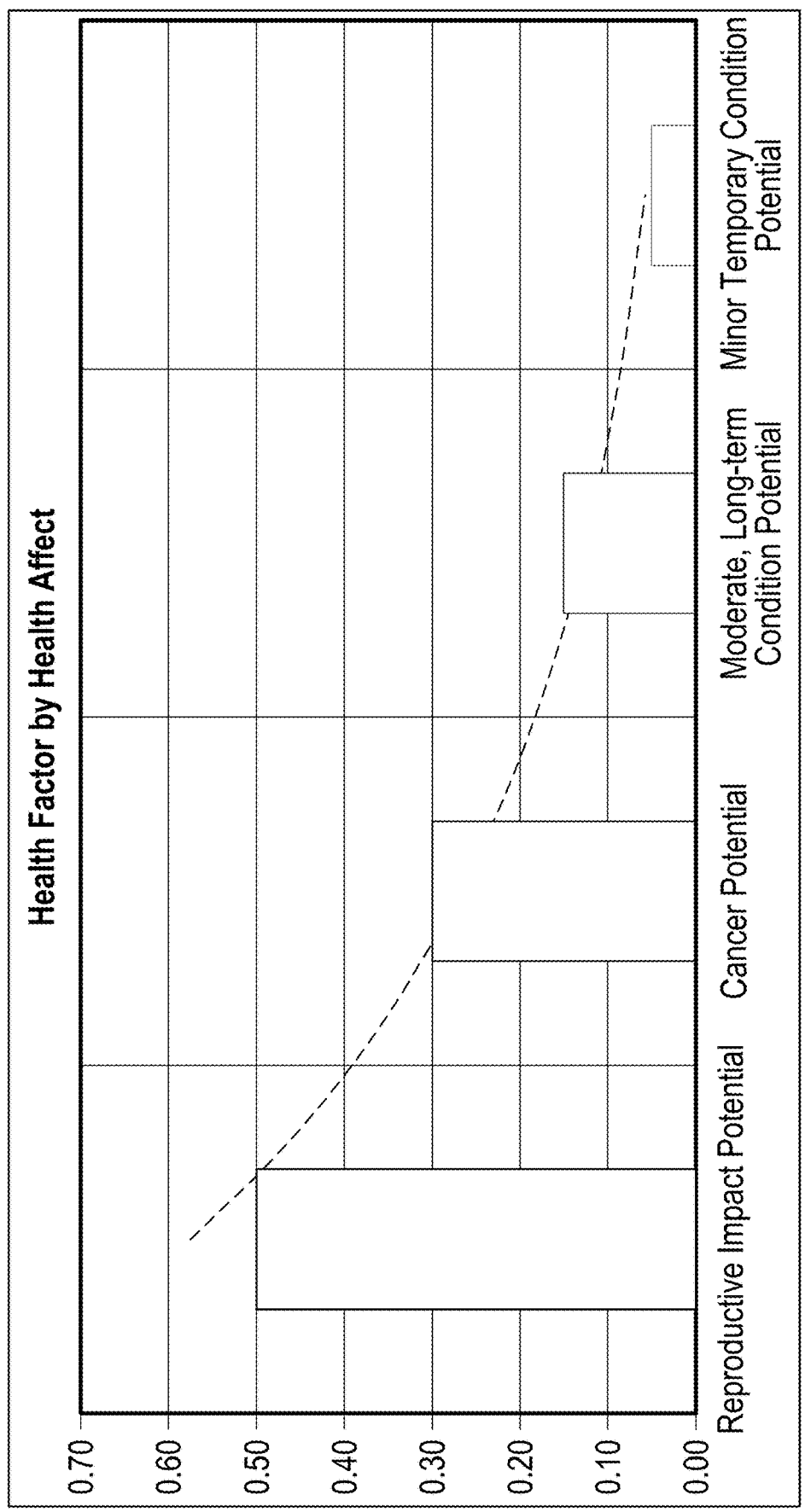
FIG. 20 illustrates an example of ranking health factors.

FIG. 20 illustrates an example of ranking health factors, which can be used in identifying in which tier various contaminants should be placed. As illustrated, contaminants with reproductive impact rank highest in health affect, followed by contaminants with cancer potential, then moderate/long-term health conditions, and finally minor/temporary conditions. In other circumstances or configurations, these respective rankings may change.

Figure 21:
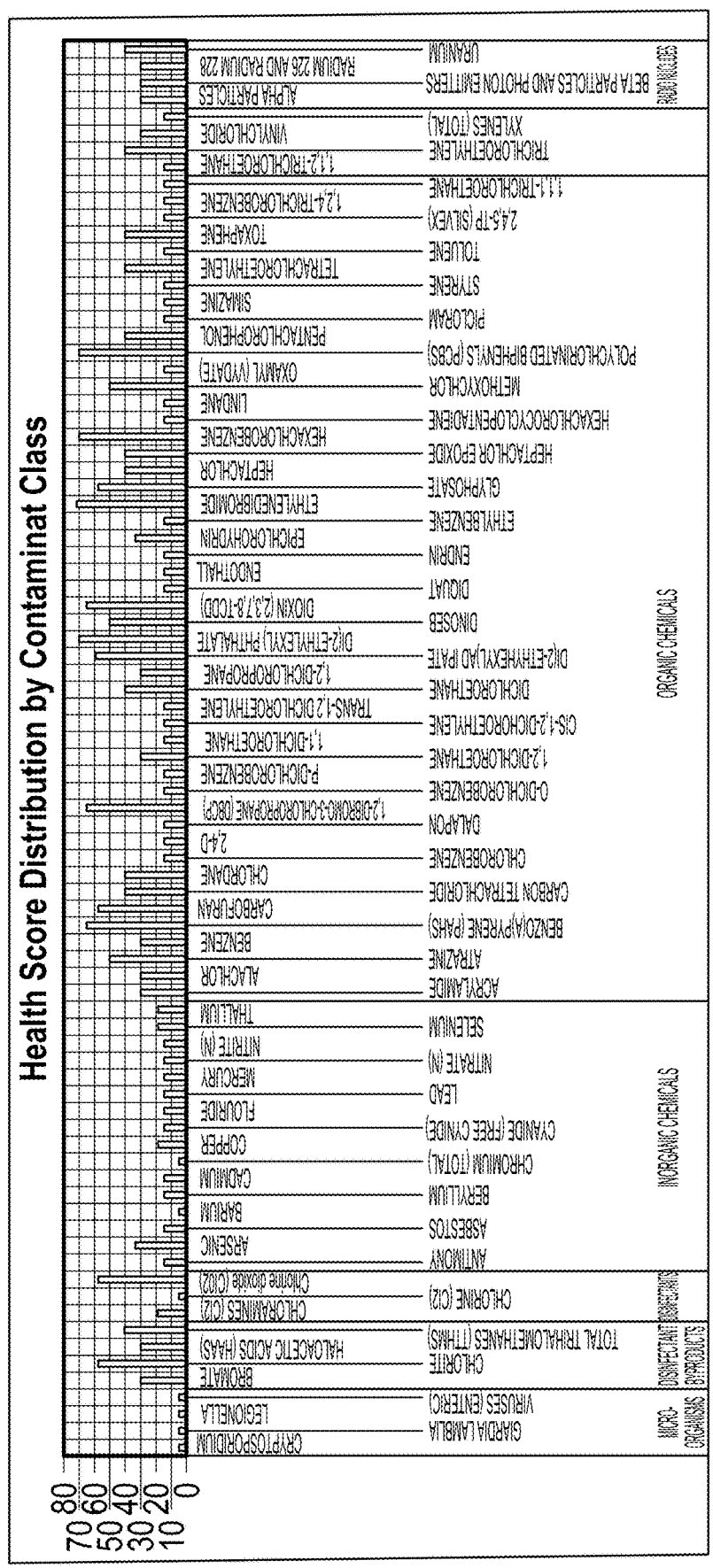
FIG. 21 illustrates an example of clustering contaminants by type.

FIG. 21 illustrates an example of clustering contaminants by type. In this example, the respective contaminants are organized into the type of class. Examples illustrated can include inorganic chemicals, organic chemicals, micro-organisms, disinfectants, disinfectant byproducts, radionuclides. In other configurations, more or less categories/types of contaminants can be present. The impact of the contaminants on the Water Quality Index score can be based on the type of contaminant to which the contaminant belongs.

Figure 22:
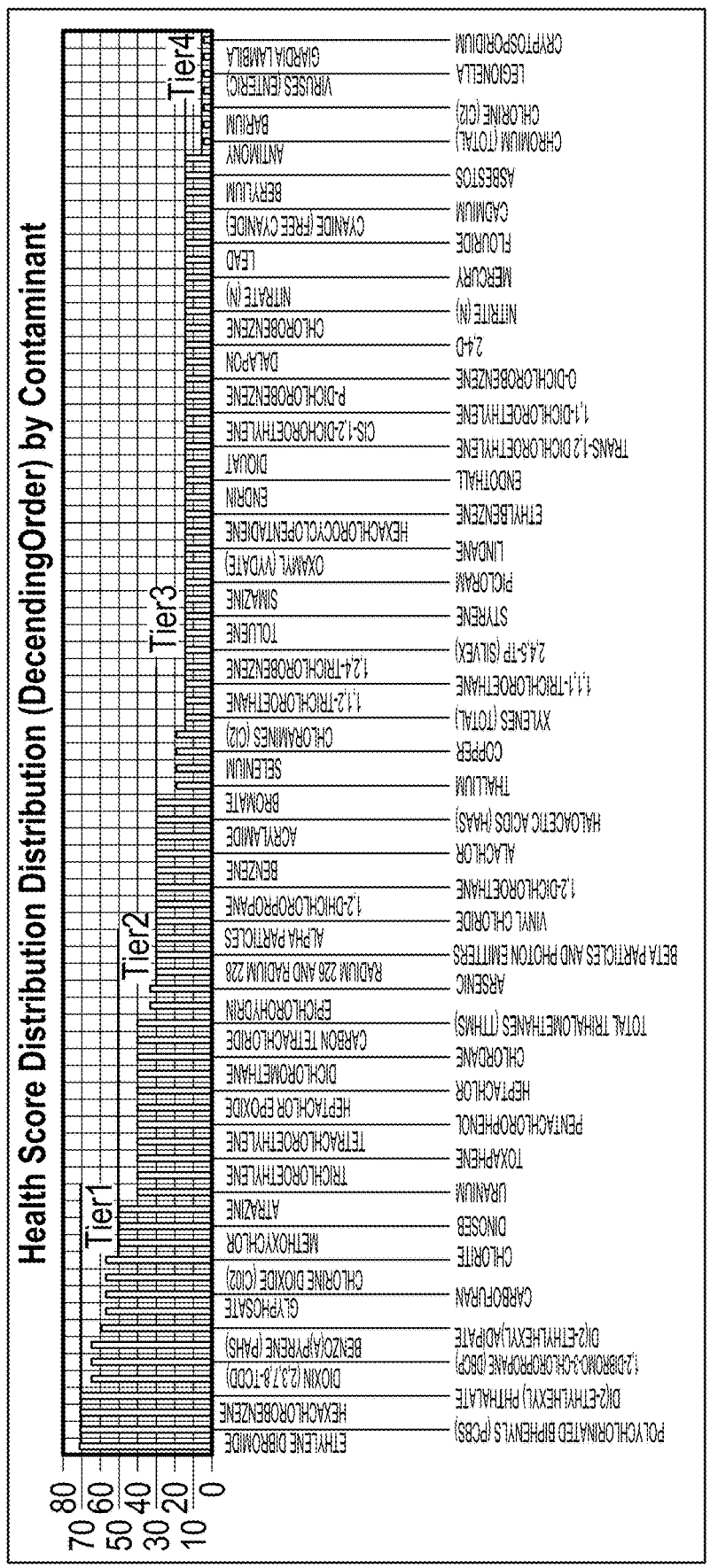
FIG. 22 illustrates an example of ranking contaminants.

FIG. 22 illustrates an example of ranking contaminants. In this example, the contaminants are organized by the health impact each respective contaminant may have, allowing the contaminants to be organized into the respective tiers described above. The impact of the contaminants on the water quality index score can be based on the tier two which the contaminants are assigned.

Figure 23:
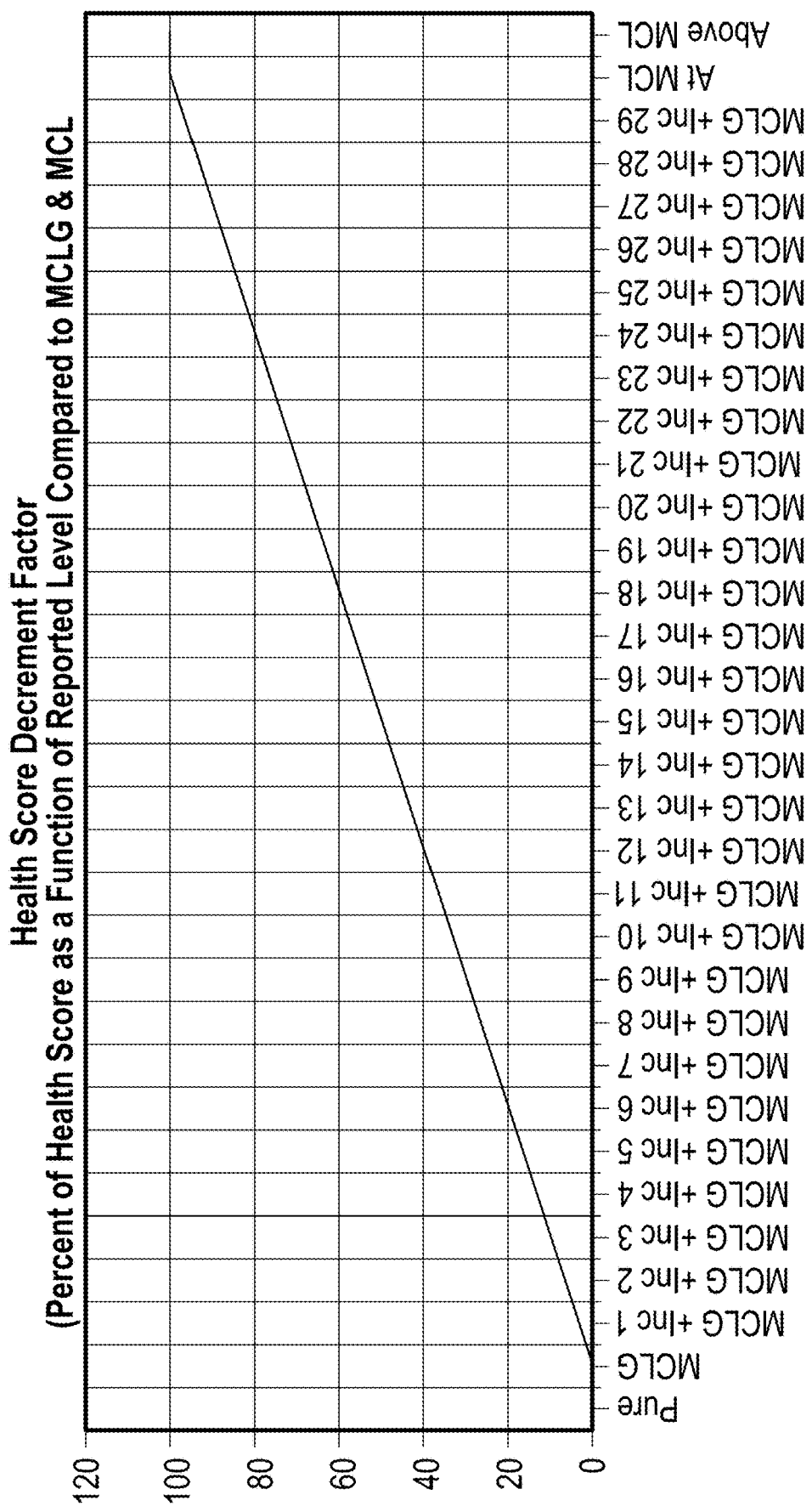
FIG. 23 illustrates an example of scoring water quality based on contaminant scores.

FIG. 23 illustrates an example of scoring water quality based on contaminant scores, compared to the Maximum Contaminant Level Goal (MCLG) and/or Maximum Contaminant Level (MCL). As illustrated, the goal in this example is for the MCLG to be at 0, or equivalent to pure water, whereas the MCL is set to be 100, or maximum contaminants. Each respective contaminant increases the overall decrement factor, effectively reducing the water quality index score. As illustrated, the decrement factor increases linearly across the various contaminants. However, in many instances the decrement factor will change in a non-linear manner depending on the type of contaminant detected, the quantity of that contaminant, etc.

Figure 24:
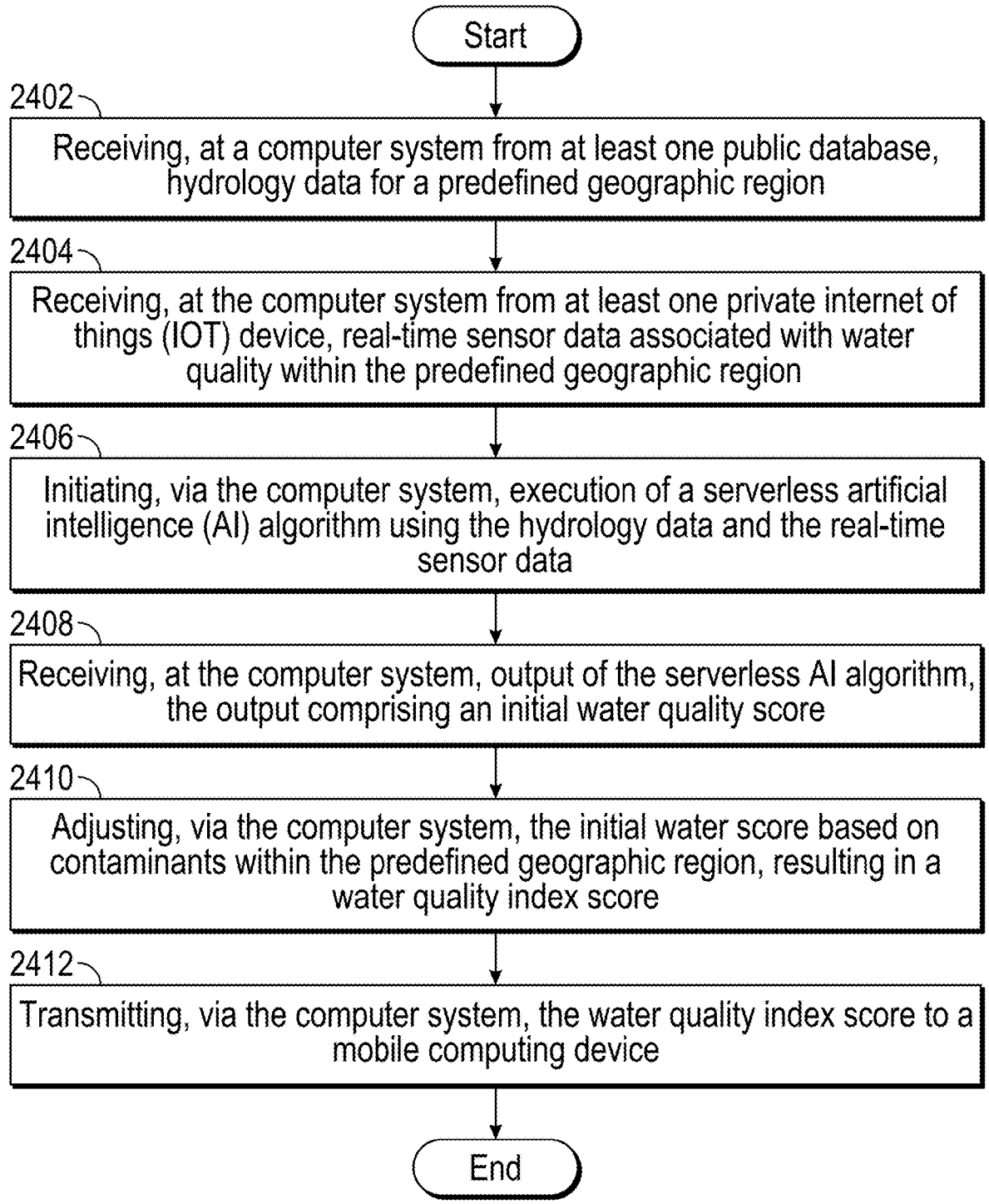
FIG. 24 illustrates an example method embodiment.

FIG. 24 illustrates an example method embodiment. In this example, a computer system configured as disclosed herein receives, from at least one public database, hydrology data for a predefined geographic region (2402). The system receives, from at least one public and/or private Internet of Things (IOT) device, real-time sensor data associated with water quality within the predefined geographic region (2404) and initiates execution of a serverless Artificial Intelligence (AI) algorithm using the hydrology data and the real-time sensor data (2406). The system receives output of the serverless AI algorithm, the output comprising an initial water quality score (2408), and adjusts the initial water quality score based on contaminants within the predefined geographic region, resulting in a water quality index score (2410). The system then transmits the water quality index score to a mobile computing device (2412).

In some configurations, the illustrated method can further include: web scraping at least one website associated with the contaminants, resulting in contaminant data, wherein the initial water quality score of the serverless AI algorithm is based on the contaminant data. The illustrated method may be further augmented by generating, for each of the contaminants, a contiguous function associating a health factor to the contaminant data, wherein the water quality index score is based on the contiguous function. In some configurations, the health factor is for human beings, whereas in other the health factor is for livestock, wildlife, insects, and/or plants. In some configurations the contiguous function is linear, non-linear, includes a step portion, or any combination thereof.

In some configurations, the contaminants are tiered according to impact on the water quality index score, where the amount of contaminants reported in public records and/or detected by the IOT sensors impacts the scores according to which tier they are assigned.

Figure 25:
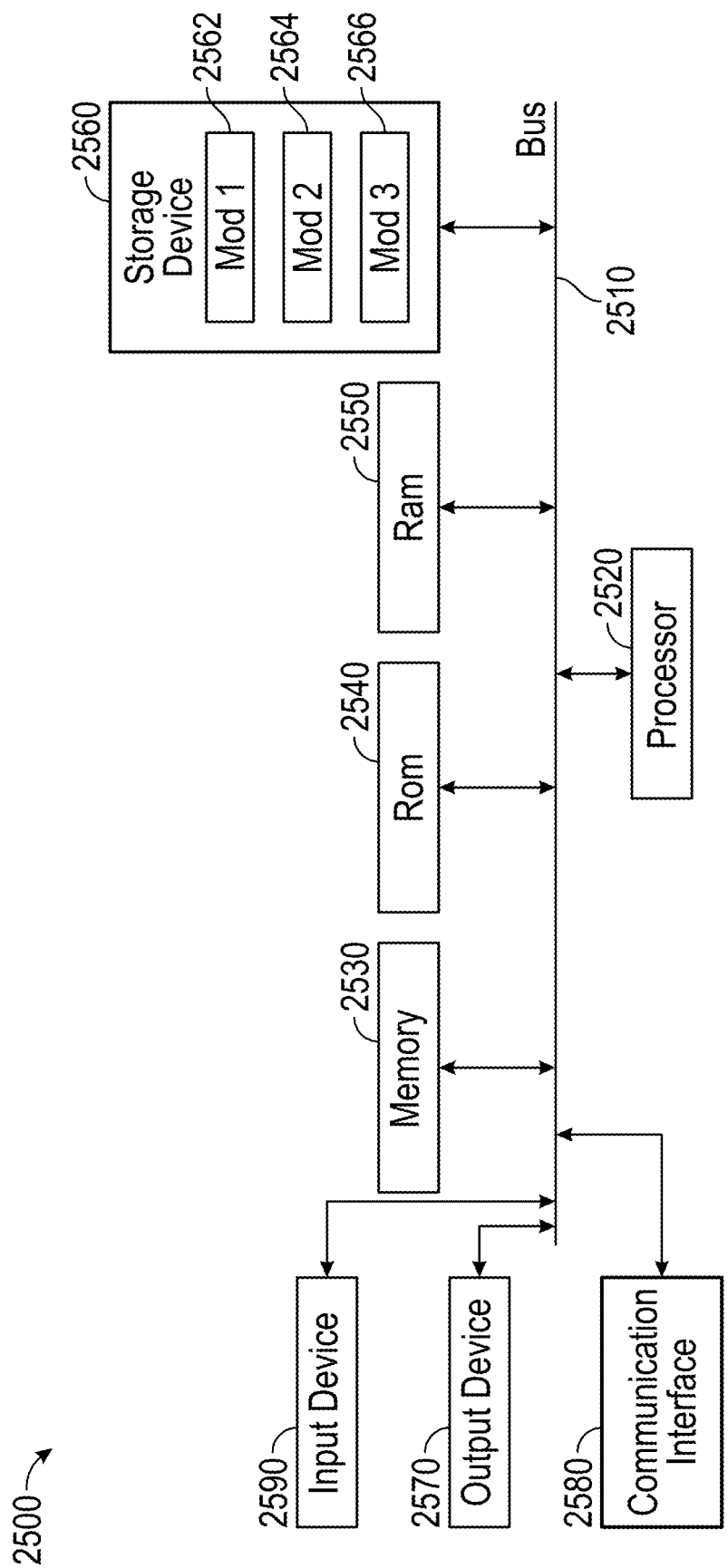
FIG. 25 illustrates an example computer system.

With reference to FIG. 25, an exemplary system includes a general-purpose computing device 2500, including a processing unit (CPU or processor) 2520 and a system bus 2510 that couples various system components including the system memory 2530 such as read-only memory (ROM) 2540 and random access memory (RAM) 2550 to the processor 2520. The system 2500 can include a cache of high-speed memory connected directly with, in close proximity to, or integrated as part of the processor 2520. The system 2500 copies data from the memory 2530 and/or the storage device 2560 to the cache for quick access by the processor 2520. In this way, the cache provides a performance boost that avoids processor 2520 delays while waiting for data. These and other modules can control or be configured to control the processor 2520 to perform various actions. Other system memory 2530 may be available for use as well. The memory 2530 can include multiple different types of memory with different performance characteristics. It can be appreciated that the disclosure may operate on a computing device 2500 with more than one processor 2520 or on a group or cluster of computing devices networked together to provide greater processing capability. The processor 2520 can include any general purpose processor and a hardware module or software module, such as module 1 2562, module 2 2564, and module 3 2566 stored in storage device 2560, configured to control the processor 2520 as well as a special-purpose processor where software instructions are incorporated into the actual processor design. The processor 2520 may essentially be a completely self-contained computing system, containing multiple cores or processors, a bus, memory controller, cache, etc. A multi-core processor may be symmetric or asymmetric.

The system bus 2510 may be any of several types of bus structures including a memory bus or memory controller, a peripheral bus, and a local bus using any of a variety of bus architectures. A basic input/output (BIOS) stored in ROM 2540 or the like, may provide the basic routine that helps to transfer information between elements within the computing device 2500, such as during start-up. The computing device 2500 further includes storage devices 2560 such as a hard disk drive, a magnetic disk drive, an optical disk drive, tape drive or the like. The storage device 2560 can include software modules 2562, 2564, 2566 for controlling the processor 2520. Other hardware or software modules are contemplated. The storage device 2560 is connected to the system bus 2510 by a drive interface. The drives and the associated computer-readable storage media provide non-volatile storage of computer-readable instructions, data structures, program modules and other data for the computing device 2500. In one aspect, a hardware module that performs a particular function includes the software component stored in a tangible computer-readable storage medium in connection with the necessary hardware components, such as the processor 2520, bus 2510, display 2570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 2500 is a small, handheld computing device, a desktop computer, or a computer server.

Although the exemplary embodiment described herein employs the hard disk 2560, other types of computer-readable media which can store data that are accessible by a computer, such as magnetic cassettes, flash memory cards, digital versatile disks, cartridges, random access memories (RAMs) 2550, and read-only memory (ROM) 2540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 2500, an input device 2590 represents any number of input mechanisms, such as a microphone for speech, a touch-sensitive screen for gesture or graphical input, keyboard, mouse, motion input, speech and so forth. An output device 2570 can also be one or more of a number of output mechanisms known to those of skill in the art. In some instances, multimodal systems enable a user to provide multiple types of input to communicate with the computing device 2500. The communications interface 2580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z." "at least one of X, Y, or Z," "at least one or more of X, Y, and Z," "at least one or more of X, Y, or Z," "at least one or more of X, Y, and/or Z," or "at least one of X. Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
    receiving, at a computer system from at least one public database, hydrology data for a predefined geographic region;
    receiving, at the computer system, water quality data associated with water quality within the predefined geographic region;
    identifying, within the water quality data, at least one missing data point;
    initiating, via at least one processor of the computer system, execution of a serverless Artificial Intelligence (AI) algorithm using the hydrology data and the water quality data, wherein the serverless AI algorithm generates a prediction of the at least one missing data point using a combination of:
        agricultural runoff for the predefined geographic region;
        stormwater runoff for the predefined geographic region; and
        weather predictions for the predefined geographic region;
    receiving, at the computer system while the serverless AI algorithm continues execution, output of the serverless AI algorithm, the output comprising an initial water quality score;
    adjusting, via the at least one processor while the serverless AI algorithm continues execution, inputs to the serverless AI algorithm based on contaminants within the predefined geographic region, resulting in an updated water quality score, wherein the contaminants are tiered according to impact on water quality score;
    transmitting, via the computer system, the updated water quality score to a mobile computing device; and
    removing at least one contaminant within the contaminants from water in the predefined geographic region based on the updated water quality score.

2. The method of claim 1, further comprising:
    web scraping at least one website associated with the contaminants, resulting in scraped contaminant data,
    wherein the initial water quality score of the serverless AI algorithm is based on the scraped contaminant data; and
    wherein the water quality data is received from at least one Internet of Things (IOT) device generating real time sensor data.

3. The method of claim 2, further comprising:
    generating, for each of the contaminants, a contiguous function associating a health factor to the scraped contaminant data,
    wherein the updated water quality score is based on the contiguous function.

4. The method of claim 3, wherein the health factor is for human beings.

5. The method of claim 3, wherein the health factor is for livestock.

6. The method of claim 3, wherein the contiguous function is non-linear.

7. The method of claim 3, wherein the contiguous function comprises a step portion.

8. A system comprising:
    at least one processor; and
    a non-transitory computer-readable storage medium having instructions stored which, when executed by the at least one processor, cause the at least one processor to perform operations comprising:
        receiving, from at least one public database, hydrology data for a predefined geographic region;
        receiving water quality data associated with water quality within the predefined geographic region;
        identifying, within the water quality data, at least one missing data point;
        initiating execution of a serverless Artificial Intelligence (AI) algorithm using the hydrology data and the water quality data, wherein the serverless AI algorithm generates a prediction of the at least one missing data point using a combination of:
            agricultural runoff for the predefined geographic region;
            stormwater runoff for the predefined geographic region; and
            weather predictions for the predefined geographic region;
        receiving, while the serverless AI algorithm continues execution, output of the serverless AI algorithm, the output comprising an initial water quality score;
        adjusting, while the serverless AI algorithm continues execution, inputs to the serverless AI algorithm based on contaminants within the predefined geographic region, resulting in an updated water quality score, wherein the contaminants are tiered according to impact on water quality score;
        transmitting the updated water quality score to a mobile computing device; and
        causing removal of at least one contaminant within the contaminants from water in the predefined geographic region based on the updated water quality score.

9. The system of claim 8, the non-transitory computer-readable storage medium having additional instructions stored which, when executed by the at least one processor, cause the at least one processor to perform operations comprising:
    web scraping at least one website associated with the contaminants, resulting in contaminant data,
    wherein the initial water quality score of the serverless AI algorithm is based on the contaminant data; and
    wherein the water quality data is received from at least one Internet of Things (IOT) device generating real time sensor data.

10. The system of claim 9, the non-transitory computer-readable storage medium having additional instructions stored which, when executed by the at least one processor, cause the at least one processor to perform operations comprising:
    generating, for each of the contaminants, a contiguous function associating a health factor to the contaminant data,
    wherein the updated water quality score is based on the contiguous function.

11. The system of claim 10, wherein the health factor is for human beings.

12. The system of claim 10, wherein the health factor is for livestock.

13. The system of claim 10, wherein the contiguous function is non-linear.

14. The system of claim 10, wherein the contiguous function comprises a step portion.

15. A non-transitory computer-readable storage medium having instructions stored which, when executed by at least one processor, cause the at least one processor to perform operations comprising:
receiving, from at least one public database, hydrology data for a predefined geographic region;
receiving water quality data associated with water quality within the predefined geographic region;
identifying, within the water quality data, at least one missing data point;
initiating execution of a serverless Artificial Intelligence (AI) algorithm using the hydrology data and the water quality data, wherein the serverless AI algorithm generates a prediction of the at least one missing data point using a combination of:
agricultural runoff for the predefined geographic region;
stormwater runoff for the predefined geographic region; and
weather predictions for the predefined geographic region;
receiving, while the serverless AI algorithm continues execution, output of the serverless AI algorithm, the output comprising an initial water quality score;
adjusting, while the serverless AI algorithm continues execution, inputs to the serverless AI algorithm based on contaminants within the predefined geographic region, resulting in an updated water quality score, wherein the contaminants are tiered according to impact on water quality score;
transmitting the updated water quality score to a mobile computing device; and
causing removal of at least one contaminant within the contaminants from water in the predefined geographic region based on the updated water quality score.

16. The non-transitory computer-readable storage medium of claim 15, having additional instructions stored which, when executed by the at least one processor, cause the at least one processor to perform operations comprising:
web scraping at least one website associated with the contaminants, resulting in contaminant data,
wherein the initial water quality score of the serverless AI algorithm is based on the contaminant data; and
wherein the water quality data is received from at least one Internet of Things (IOT) device generating real time sensor data.

17. The non-transitory computer-readable storage medium of claim 16, having additional instructions stored which, when executed by the at least one processor, cause the at least one processor to perform operations comprising:
generating, for each of the contaminants, a contiguous function associating a health factor to the contaminant data,
wherein the updated water quality score is based on the contiguous function.

18. The non-transitory computer-readable storage medium of claim 17, wherein the health factor is for human beings.

19. The method of claim 1, wherein the serverless AI algorithm:
tracks impacts of the contaminants within the predefined geographic region across at least two dimensions;
generates, for each contaminant in the contaminants, a cartesian relationship in each dimension of the at least two dimensions, resulting in at least two cartesian relationships; and
identifies a level of toxicity for each contaminant in the contaminants based on the at least two cartesian relationships.

20. The method of claim 19, further comprising:
mitigating impact of at least one contaminant based on the updated water quality score.

21. A method comprising:
receiving, at a computer system from at least one public database, hydrology data for a predefined geographic region;
receiving, at the computer system from at least one Internet of Things (IOT) device, real-time sensor data associated with water quality within the predefined geographic region;
initiating, via at least one processor of the computer system, execution of a serverless Artificial Intelligence (AI) algorithm using the hydrology data and the real-time sensor data;
receiving, at the computer system while the serverless AI algorithm continues execution, output of the serverless AI algorithm, the output comprising an initial water quality score;
adjusting, via the at least one processor while the serverless AI algorithm continues execution, inputs to the serverless AI algorithm based on contaminants within the predefined geographic region, resulting in an updated water quality score,
wherein the contaminants are tiered according to impact on water quality score, and
wherein the serverless AI algorithm:
tracks impacts of the contaminants within the predefined geographic region across at least two dimensions;
generates, for each contaminant in the contaminants, a cartesian relationship in each dimension of the at least two dimensions, resulting in at least two cartesian relationships; and
identifies a level of toxicity for each contaminant in the contaminants based on the at least two cartesian relationships;
transmitting, via the computer system, the updated water quality score to a mobile computing device; and
causing removal of at least one contaminant within the contaminants from water in the predefined geographic region based on the updated water quality score.

22. A method comprising:
receiving, at a computer system from at least one public database, hydrology data for a predefined geographic region;
receiving, at the computer system, water quality data associated with water quality within the predefined geographic region;
identifying, within the water quality data, at least one missing data point;
initiating, via at least one processor of the computer system, execution of a serverless Artificial Intelligence (AI) algorithm using the hydrology data and the water quality data, wherein the serverless AI algorithm generates a prediction of the at least one missing data point using a combination of:

agricultural runoff for the predefined geographic region;

stormwater runoff for the predefined geographic region; and weather predictions for the predefined geographic region;

receiving, at the computer system while the serverless AI algorithm continues execution, output of the serverless AI algorithm, the output comprising an initial water quality score;

adjusting, via the at least one processor while the serverless AI algorithm continues execution, inputs to the serverless AI algorithm based on contaminants within the predefined geographic region, resulting in an updated water quality score, wherein the contaminants are tiered according to impact on water quality score;

transmitting, via the computer system, the updated water quality score to a mobile computing device; and mitigating impact of at least one contaminant based on the updated water quality score by adding a filter configured to remove the at least one contaminant from water in the predefined geographic region.

* * * * *